US012707337B2

(12) United States Patent
Ratnam et al.

(10) Patent No.: US 12,707,337 B2
(45) Date of Patent: Aug. 11, 2026

(54) METHOD AND APPARATUS FOR SERVICE LEVEL AGREEMENT MONITORING AND VIOLATION MITIGATION IN WIRELESS COMMUNICATION NETWORKS

(71) Applicant: Samsung Electronics Co., Ltd., Suwon-si (KR)

(72) Inventors: Vishnu Vardhan Ratnam, Plano, TX (US); Hao Chen, Allen, TX (US); Rubayet Shafin, Allen, TX (US); Jianzhong Zhang, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 1037 days.

(21) Appl. No.: 17/645,941

(22) Filed: Dec. 23, 2021

(65) Prior Publication Data

US 2022/0377616 A1 Nov. 24, 2022

Related U.S. Application Data

(60) Provisional application No. 63/189,557, filed on May 17, 2021.

(51) Int. Cl.
*H04W 28/24* (2009.01)
*H04W 24/04* (2009.01)
(Continued)

(52) U.S. Cl.
CPC ........... *H04W 28/24* (2013.01); *H04W 24/04* (2013.01); *H04W 24/08* (2013.01); *H04W 24/10* (2013.01);
(Continued)

(58) Field of Classification Search
CPC . H04W 28/24; H04W 24/04; H04W 28/0268; H04W 72/569; H04W 24/10;
(Continued)

(56) References Cited

U.S. PATENT DOCUMENTS 10,904,799 B2 1/2021 Fujishiro
11,026,106 B2 6/2021 Bor-Yaliniz et al.
(Continued)

FOREIGN PATENT DOCUMENTS

CN 110178398 A 8/2019
CN 111225420 A 6/2020
KR 10-2005-0054665 A 6/2005

OTHER PUBLICATIONS

IEEE, "Performance Measurements-based Estimation of Radio Resource Requirements for Slice Admission Control" 2019 IEEE Vehicular Technology Conference (VTC2019-Fall), 2019, pp. 1-6 (Year: 2019).*
(Continued)

*Primary Examiner* — Tonia L Dollinger

(57) ABSTRACT

An apparatus includes a network interface, a processor and a memory. The memory contains instructions, which when executed by the processor, cause the apparatus to identify a target base station and a target slice comprising an electronic device for service level agreement (SLA) monitoring, send, via the network interface to the target base station, a trigger message for initiating SLA reporting by the electronic device of the target slice connected to the target base station, receive, from the target base station via the network interface, at least one SLA report from the electronic device of the target slice, determine an SLA violation level based on the at least one SLA report, determine updated scheduling parameters based on the SLA violation level, and send the updated scheduling parameters to the target base station via the network interface.

20 Claims, 16 Drawing Sheets

(51) Int. Cl.
*H04W 24/08* (2009.01)
*H04W 24/10* (2009.01)
*H04W 28/02* (2009.01)
*H04W 72/566* (2023.01)

(52) U.S. Cl.
CPC ..... *H04W 28/0268* (2013.01); *H04W 72/569* (2023.01)

(58) Field of Classification Search
CPC .. H04W 24/08; H04W 24/02; H04L 41/5009; H04L 41/0695; H04L 41/5025
See application file for complete search history.

(56) References Cited

U.S. PATENT DOCUMENTS

| | | | |
|---|---|---|---|
| 11,057,284 | B2 | 7/2021 | Anya et al. |
| 2018/0152958 | A1* | 5/2018 | Arnold et al. .......... H04L 41/40 |
| 2019/0182752 | A1* | 6/2019 | Lou et al. ............. H04W 48/08 |
| 2019/0335349 | A1 | 10/2019 | Vaishnavi et al. |
| 2020/0007414 | A1 | 1/2020 | Smith et al. |
| 2020/0044943 | A1* | 2/2020 | Bor-Yaliniz et al. ........................ H04L 41/5009 |
| 2020/0167258 | A1 | 5/2020 | Chattopadhyay et al. |
| 2020/0236594 | A1* | 7/2020 | Tang et al. .......... H04L 41/5048 |
| 2020/0383043 | A1 | 12/2020 | Wei et al. |
| 2021/0160897 | A1* | 5/2021 | Young ............... H04W 72/1257 |
| 2021/0209481 | A1 | 7/2021 | Moradi et al. |
| 2021/0282072 | A1 | 9/2021 | Xin et al. |
| 2021/0288888 | A1* | 9/2021 | Ronen et al. ......... H04W 24/02 |
| 2022/0022090 | A1* | 1/2022 | Schliwa-Bertling et al. ............... H04L 41/5025 |
| 2022/0070709 | A1* | 3/2022 | Kumar et al. ........ H04W 24/10 |
| 2022/0322154 | A1* | 10/2022 | Liu et al. .............. H04W 24/10 |
| 2023/0083063 | A1* | 3/2023 | Badrinath et al. .. H04L 41/0806 |
| 2024/0049021 | A1* | 2/2024 | Fan et al. ............ H04L 41/5009 |
| 2024/0089789 | A1* | 3/2024 | Kim et al. ........ H04W 28/0268 |
| 2024/0196253 | A1* | 6/2024 | Redhwan et al. .... H04W 24/10 |

OTHER PUBLICATIONS

Khodapanah, et al. "Framework for Slice-Aware Radio Resource Management Utilizing Artificial Neural Networks", IEEE Access, vol. 8, Sep. 23, 2020, 16 pgs.

International Search Report and Written Opinion issued Jun. 14, 2022 regarding International Application No. PCT/KR2022/002990, 8 pages.

China Unicom et al., "Discussion on requirements and mechanisms for per slice QoE measurement", 3GPP TSG-RAN WG3 Meeting #110e, R3-206493, Nov. 2020, 3 pages.

Moderator(ZTE), "TP for Per slice QoE measurement", 3GPP TSG-RAN WG3 Meeting #111e, R3-211190, Jan. 2020, 3 pages.

* cited by examiner

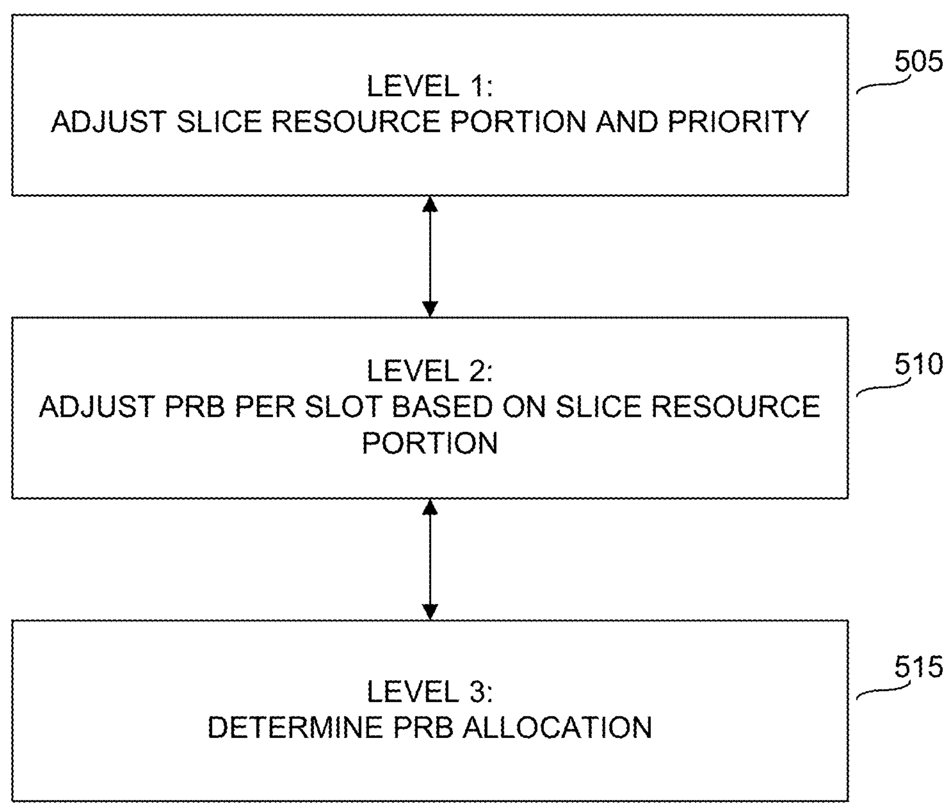
FIG. 5

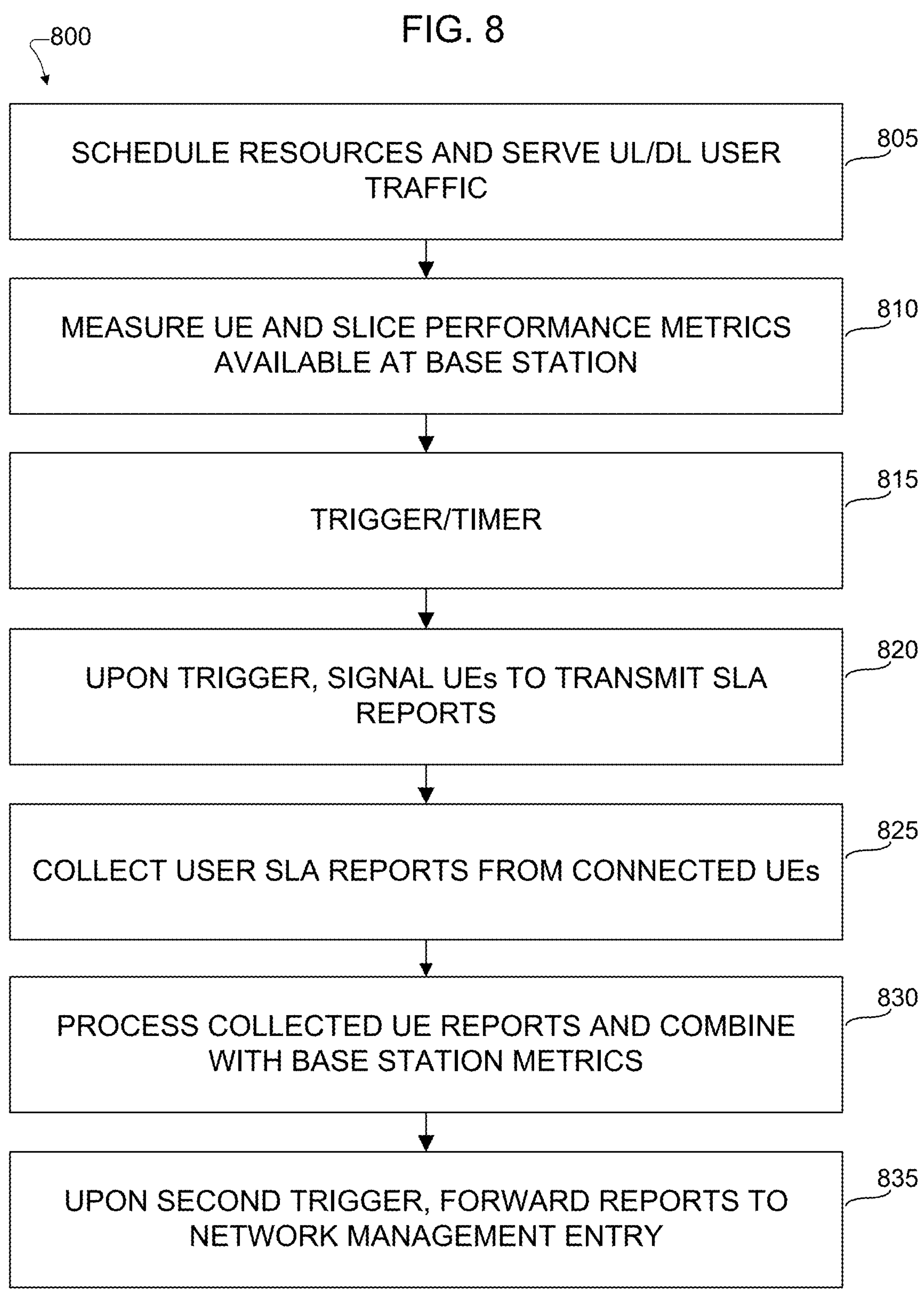
FIG. 8
800
SCHEDULE RESOURCES AND SERVE UL/DL USER TRAFFIC
805
MEASURE UE AND SLICE PERFORMANCE METRICS AVAILABLE AT BASE STATION
810
TRIGGER/TIMER
815
UPON TRIGGER, SIGNAL UEs TO TRANSMIT SLA REPORTS
820
COLLECT USER SLA REPORTS FROM CONNECTED UEs
825
PROCESS COLLECTED UE REPORTS AND COMBINE WITH BASE STATION METRICS
830
UPON SECOND TRIGGER, FORWARD REPORTS TO NETWORK MANAGEMENT ENTRY
835

1400
MEASURE ONE OR MORE KEY PERFORMANCE INDICATORS (KPIs) OF CONNECTION WITH BASE STATION
1405
STORE MEASURED KPIS
1410
RECEIVE SLA REPORTING MESSAGE
1415
RESPONSIVE TO RECEIVING SLA REPORTING MESSAGE, TRANSMIT SLA REPORT
1420

METHOD AND APPARATUS FOR SERVICE LEVEL AGREEMENT MONITORING AND VIOLATION MITIGATION IN WIRELESS COMMUNICATION NETWORKS

CROSS-REFERENCE TO RELATED APPLICATION AND CLAIM OF PRIORITY

This application claims priority under 35 U.S.C. § 119(e) to U.S. Provisional Patent Application No. 63/189,557 filed on May 17, 2021. The above-identified provisional patent application is hereby incorporated by reference in its entirety.

TECHNICAL FIELD

The present disclosure relates generally to wireless communication systems and, more specifically, the present disclosure relates to methods and apparatus for service-level agreement monitoring and violation mitigation in wireless communication networks.

BACKGROUND

The consequences of the above-described expansion of bandwidth and users of wireless networks include, without limitation, slicing of the pool of user devices and stratification of the service levels provided to slices of users. For example, network operators may provide a first, higher level of service to a first slice of mobile devices (for example, smartphones and the like) used for real-time communication between humans and the provision of latency-intolerant data (for example, streaming video data), but provide a second, lower level of service to a second slice of devices (for example, internet of things devices) with greater latency tolerance. Accordingly, monitoring and ensuring that wireless network services are provided at agreed-upon service levels remains a source of technical challenges and an unsolved problem in the art.

SUMMARY

This disclosure provides methods and apparatus for methods and apparatus for service-level agreement monitoring and violation mitigation in wireless communication networks.

In one embodiment, an apparatus includes a network interface, a processor and a memory. The memory contains instructions, which when executed by the processor, cause the apparatus to identify a target base station and a target slice comprising an electronic device for service level agreement (SLA) monitoring, send, via the network interface to the target base station, a trigger message for initiating SLA reporting by the electronic device of the target slice connected to the target base station, receive, from the target base station via the network interface, at least one SLA report from the electronic device of the target slice, determine an SLA violation level based on the at least one SLA report, determine updated scheduling parameters based on the SLA violation level, and send the updated scheduling parameters to the target base station via the network interface.

In another embodiment, a user equipment (UE) includes a processor configured to measure one or more key performance indicators (KPIs) of a radio connection between the UE and a base station (BS); and store the measured one or more KPIs in a memory. The UE further includes a transceiver operably coupled to the processor, the transceiver configured to receive, from the BS, a SLA reporting message and responsive to receiving the SLA reporting message, transmit, to the BS, an SLA report comprising the one or more measured KPIs.

In another embodiment, a method includes at an apparatus comprising a network interface, identifying a target base station and a target slice comprising an electronic device for SLA monitoring. The method further includes sending, via the network interface to the target base station, a trigger message for initiating SLA reporting by the electronic device of the target slice connected to the target base station, receiving, from the target base station via the network interface, at least one SLA report from the electronic device of the target slice, determining an SLA violation level based on the at least one SLA report, determining updated scheduling parameters based on the SLA violation level, and sending the updated scheduling parameters to the target base station via the network interface.

In another embodiment, a method of a UE includes measuring one or more KPIs of a radio connection between the UE and a BS, and storing the measured one or more KPIs in a memory, receiving, from the BS, a SLA reporting message, and responsive to receiving the SLA reporting message, transmitting, to the BS, an SLA report comprising the one or more measured KPIs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates an example of a network slicing and scheduling architecture 500 for slicing network service and scheduling data according to network slices, according to various embodiments of this disclosure;

FIG. 8 illustrates operations of an example method for scheduling resources and collecting SLA report data at a base station according to various embodiments of this disclosure;

FIGS. 12A and 12B illustrate, through pseudocode, an example of a rules-based method for determining updated scheduler parameters according to various embodiments of this disclosure;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present disclosure relates to a pre-5th-Generation (5G) or 5G communication system to be provided for supporting higher data rates Beyond 4th-Generation (4G) communication system such as Long-Term Evolution (LTE).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
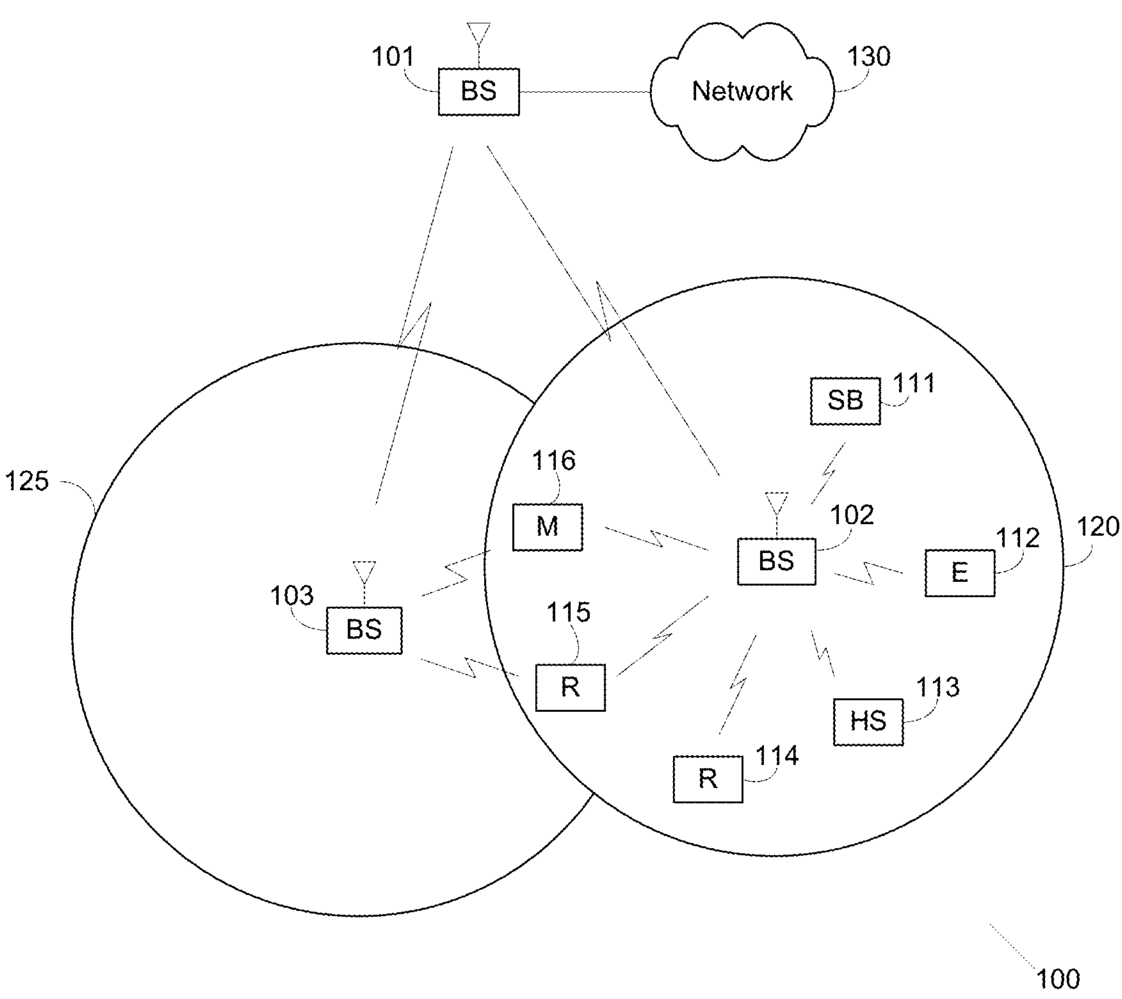
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes a base station 101, a base station 102, and a base station 103. The base station 101 communicates with the base station 102 and the base station 103. The base station 101 also communicates with at least one network 130 such as a 5G core network, the Internet, a proprietary IP network, or other data network.

Depending on the network type, the term base station can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Embodiments according to the present disclosure are not premised on network equipment belonging to a particular generation or standard set (for example, LTE, 5G, 3G, etc.) Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a base station, whether the UE is a mobile device (such as a mobile telephone or smartphone) or is normally considered a stationary device (such as a desktop computer or vending machine).

The base station 102 provides wireless broadband access to the network 130 for a first plurality of user equipments (UEs) within a coverage area 120 of the base station 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The base station 103 provides wireless broadband access to the network 130 for a second plurality of UEs within a coverage area 125 of the base station 103. The second plurality of UEs includes the UE 115 and the UE 116. In some embodiments, one or more of the base stations 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with base stations, such as the coverage areas 120 and 125, may have other shapes, including irregular shapes, depending upon the configuration of the base stations and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 can include any number of base stations and any number of UEs in any suitable arrangement. Also, the base station 101 can communicate directly with any number of UEs and provide those UEs with wireless broadband access to the network 130. Similarly, each base station 102-103 can communicate directly with the network 130 and provide UEs with direct wireless broadband access to the network 130. Further, the base station 101, 102, and/or 103 can provide access to other or additional external networks, such as external telephone networks or other types of data networks.

Figure 2:
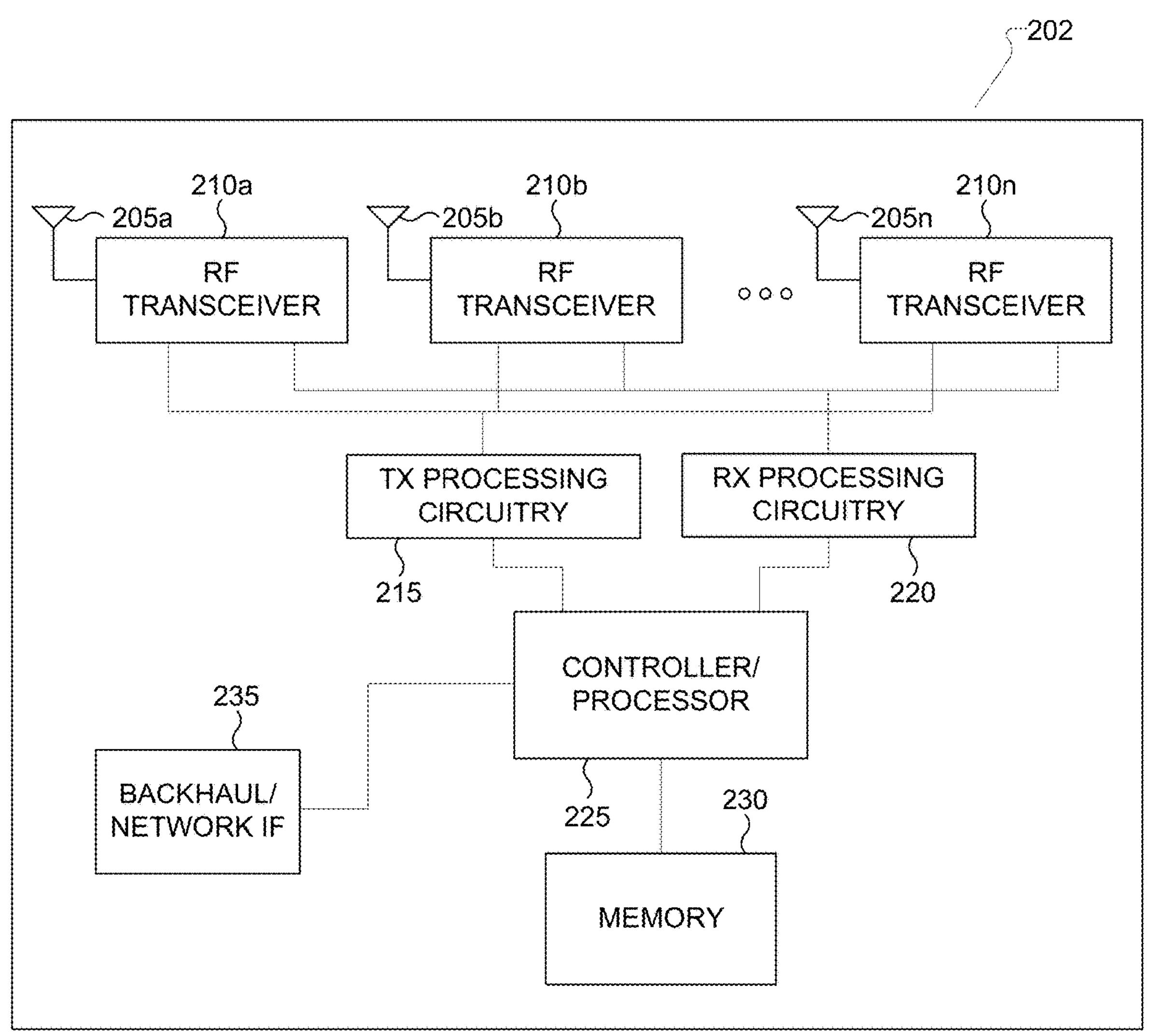
FIG. 2 illustrates an example base station according to some embodiments of this disclosure.

FIG. 2 illustrates an example base station 202 according to some embodiments of this disclosure. The embodiment of the base station 202 illustrated in FIG. 2 is for illustration only. However, base stations come in a wide variety of configurations, and FIG. 2 does not limit the scope of this disclosure to any particular implementation of base station.

As shown in the explanatory example of FIG. 2, the base station 202 includes multiple antennas 205*a*-205*n*, multiple RF transceivers 210*a*-210*n*, transmit (TX) processing circuitry 215, and receive (RX) processing circuitry 220. The base station 202 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. According to certain embodiments, TX processing circuitry 215 may modular and may comprise one or more data units (DUs) or massive multi-input/multi-output units (MMUs) for pre-coding and pre-processing multiplexed signals to be transmitted via a plurality of antennas. The RF transceivers 210*a*-210*n* receive the outgoing processed baseband or IF signals from the TX processing circuitry 215 and up-converts the baseband or IF signals to RF signals that are transmitted via the antennas 205*a*-205*n*. According to certain embodiments, the RF signals transmitted via antennas 205*a*-205*n* are encoded such that data to be transmitted, and the associated signaling are apportioned to time/frequency resource blocks ("RBs"). In this illustrative example, base station 202 provides, through antennas 205*a*-205*n* wireless signals over a coverage area, and has a number of operational parameters, such as antenna height, electronic and mechanical tilt, by which the coverage area can be tuned. In this way, the base station can, for example, transmit signals satisfying threshold values for received signal strength and received signal quality within a designated coverage area of the base station.

The controller/processor 225 can include one or more processors or other processing devices that control the overall operation of the base station 202. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the base station 202 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the base station 202 to communicate with other devices or systems over a backhaul connection or over a network. The interface 235 could support communications over any suitable wired or wireless connection(s). For example, when the base station 202 is implemented as part of a cellular communication system (such as one supporting 5G, LTE, or LTE-A), the interface 235 could allow the base station 202 to communicate with other eNBs over a wired or wireless backhaul connection. When the base station 202 is implemented as an access point, the interface 235 could allow the base station 202 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of base station 202, various changes may be made to FIG. 2. For example, the base station 202 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the base station 202 could include multiple instances of each (such as one per RF transceiver). Also, various components in FIG. 2 could be combined, further subdivided, or omitted and additional components could be added according to particular needs.

Figure 3:
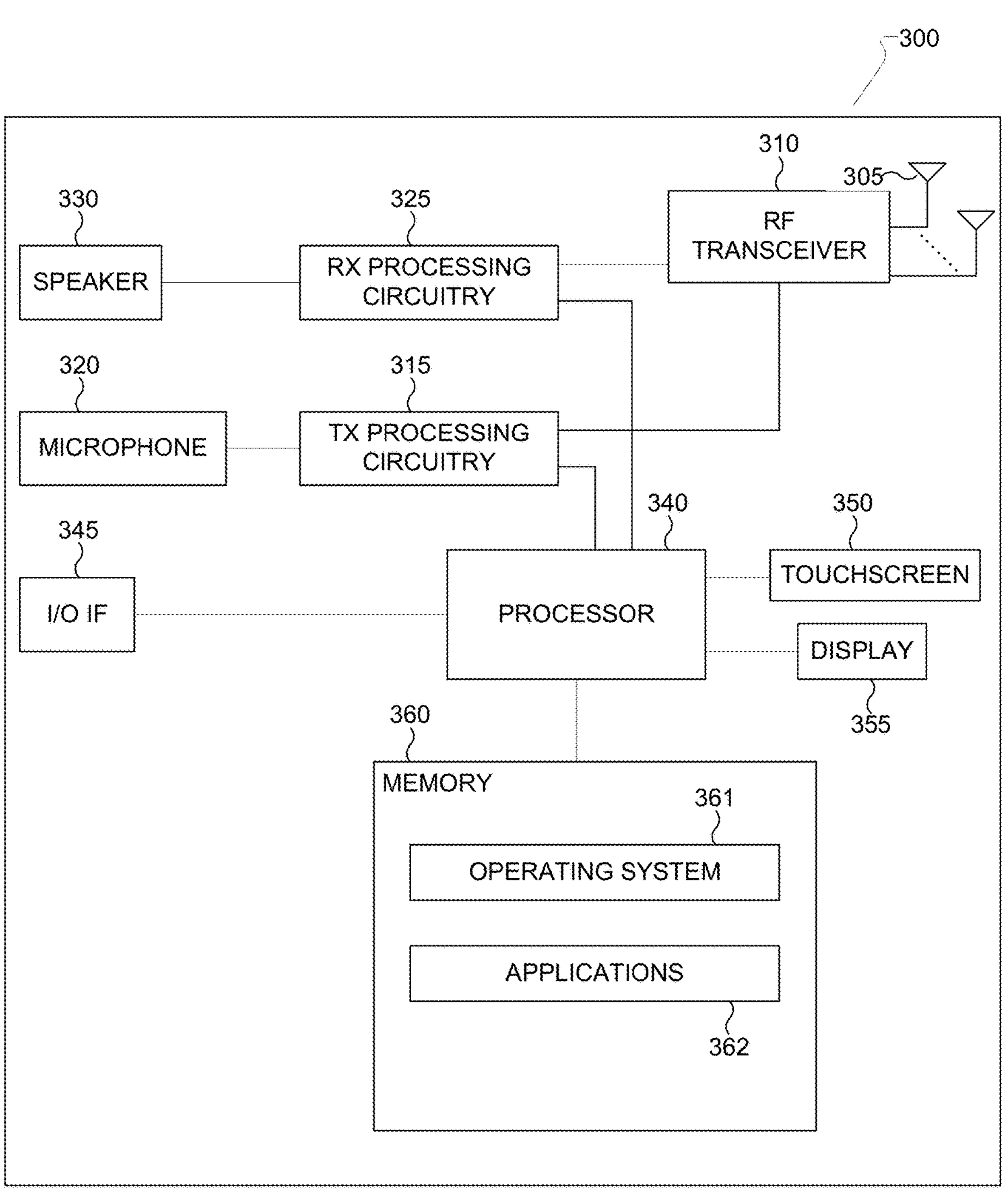
FIG. 3 illustrates an example of a user equipment ("UE") in accordance with an embodiment of this disclosure.

FIG. 3 illustrates an example UE 300 according to this disclosure. The embodiment of the UE 300 illustrated in FIG. 3 is for illustration only, and the UEs 105*a*-105*c* of FIG. 1 could have the same or similar configuration. However, UEs come in a wide variety of configurations, and FIG. 3 does not limit the scope of this disclosure to any particular implementation of a UE.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. According to certain embodiments, TX processing circuitry and RX processing circuitry encode and decode data and signaling for wireless in resource blocks ("RBs" or physical resource blocks "PRBs") which are transmitted and received by, inter alia, the eNBs of a wireless network (for example, wireless network 100 in FIG. 1). Put differently, TX processing circuitry 215 and RX processing circuitry 220 generate and receive RBs which contribute to a measured load at an eNB. Additionally, RX processing circuitry 220 may be configured to measure values of one or more parameters of signals received at UE 300.

The main processor 340 can include one or more processors or other processing devices and execute the basic OS program 361 stored in the memory 360 in order to control the overall operation of the UE 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 300 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 300 can use the keypad 350 to enter data into the UE 300. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

Although FIG. 3 illustrates one example of UE 300, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 300 configured as a mobile telephone or smartphone, UEs could be configured to operate as other types of mobile or stationary devices.

Figure 4:
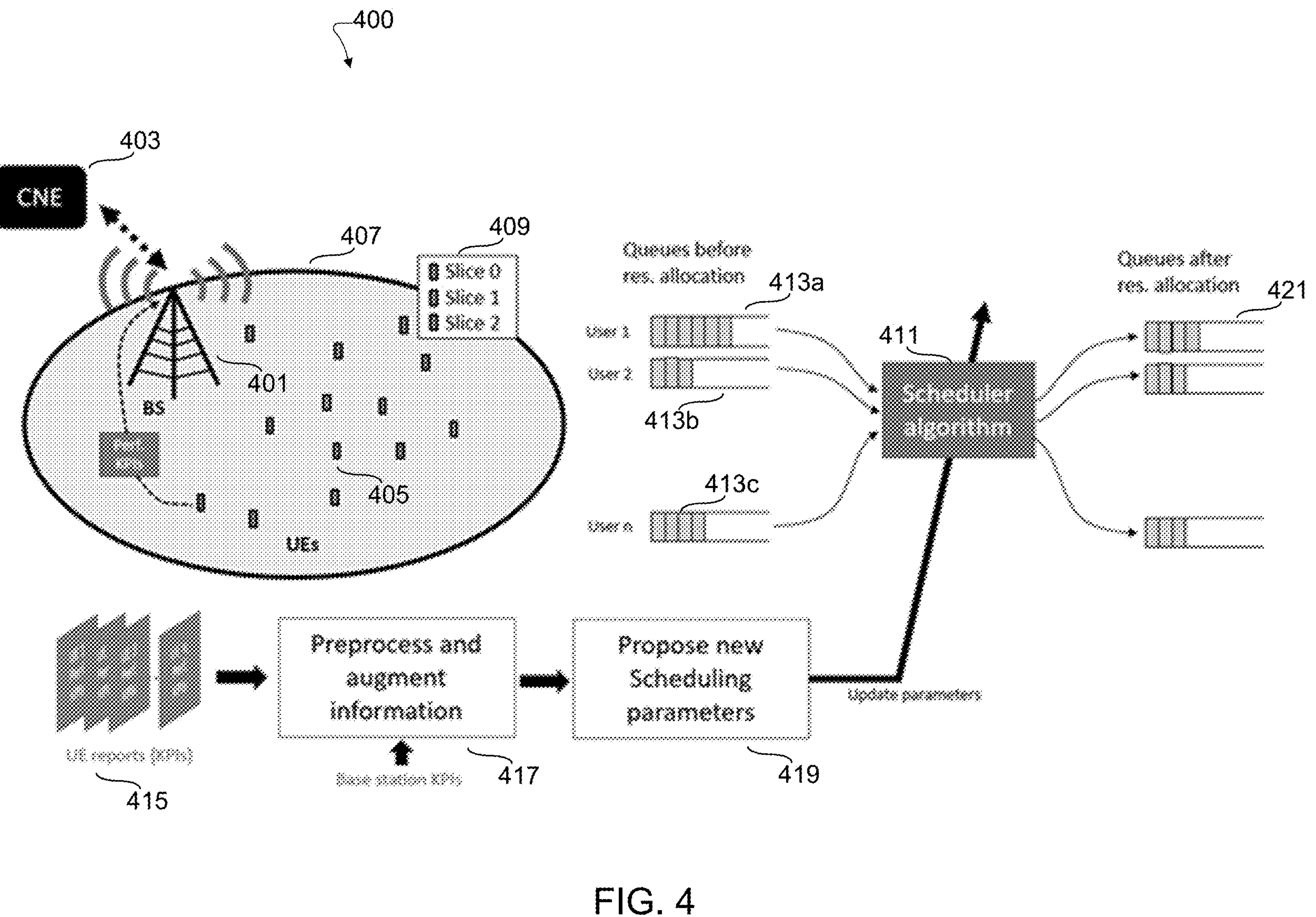
FIG. 4 illustrates an example of a network context and an overview of service level agreement (SLA) monitoring and violation mitigation according to various embodiments of this disclosure.

FIG. 4 illustrates an example of a network context 400 and an overview of service level agreement (SLA) monitoring and violation mitigation according to various embodiments of this disclosure.

Referring to the illustrative example of FIG. 4, network context 400 comprises at least one base station (BS) 401 that is connected, for example, through a backhaul link to a core network entity (CNE) 403. According to various embodiments, CNE 403 is a server or cloud-based computing platform handling core functions of a 5G network, including regulating access to the network from devices seeking to wirelessly connect through base station 401. In some embodiments, base station 401 embodies the processing and transmission/reception architecture shown with reference to FIG. 2 of this disclosure. Where base station 401 supports multiple-input-multiple-output (MIMO) communications, base station 401 may include a two-stage pre-processing architecture comprising a data unit (DU) which handles pre-scheduling of data to be transmitted via BS 401, and a massive MIMO unit (MMU), which handles pre-coding (for example, setting per-antenna phase adjustments and transmission levels) of data received from the DU. In some embodiments, base station 401 embodies an architecture in which scheduling and queueing of data to be transmitted is performed on a different processing platform of the base station.

In some embodiments, base station 401 acts as an intermediary between one or more user equipment (for example, UE 405) that receive and transmit data to CNE 403, through which the user equipment access the core network. According to various embodiments, UE 405 may be a smartphone, a tablet, a vehicle, or an internet of things (IoT) device. As shown in the illustrative example of FIG. 4, base station 401 provides wireless connectivity coverage to the core network over a specified coverage area 407. Further, the wireless connectivity provided by base station 401 may be sliced, with different user equipment within the coverage area 407 belonging to different service slices, with UEs belonging to a particular slice being provided with a level of network connectivity that meets certain requirements specified in one or more service level agreements (SLAs) (for example, data throughput rates). In this explanatory example, base station 401 serves UEs belonging to three slices, identified in the figures as "Slice 0," "Slice 1" and "Slice 2," each of which corresponds to a set of SLA constraints.

As a further example of SLA constraints, in this example, a slice s (for example, "Slice 0" in FIG. 4), is subject to the following SLA constraints: at any given time, the quality of service for 90% of the UEs in the slice must be such that: 1.) the average data transfer rate for the UE within a specified interval (for example, 1000 transmission timing intervals ("TTIs") should be greater than a specified floor value, minRate; and 2.) for 98% of the packets received by a user within a specified time interval, 98% of the packets must be lower than a specified latency ceiling maxLatency. Compliance with the SLA constraints may be computed as follows:

Let indices of users of slice s be in set $\mathcal{U}_s$, and at each TTI t, let the downlink throughput for user equipment u be $R_u$ (t). Similarly, the set of latencies of all delivered/dropped packets at TTI t for a given UE u within slice s, be $\mathcal{L}_u$ (t). Subject to these definitions, the rate metric for a UE u at a TTI t can be given by Equation 1, below:

$$\bar{R}_u(t)=\Sigma_{\delta=0}^{T}R_u(t-\delta)/_T \quad \text{Equation 1}$$

Similarly, the latency metric for UE u at TTI t may be given by Equation 2, below:

$$\bar{L}_u(t)=98\%\ \text{tile}\left(\bigcup_{0\le\delta<T}\mathcal{L}_u(t-\delta)\right) \quad \text{Equation 2}$$

Having defined the rate metric at the per-UE level, the rate component of the SLA constraint for slice s at time t may be given by Equation 3, below:

$$10\%\ \text{tile}\left(\bigcup_{u\in\mathcal{U}_s}\bar{R}_u(t)\right)\ge R_s^{min} \quad \text{Equation 3}$$

Similarly, the latency component of the SLA constraint for slice s at time t may be given by Equation 4, below:

$$90\%\ \text{tile}\left(\bigcup_{u\in\mathcal{U}_s}\bar{L}_u(t)\right)\le L_s^{max} \quad \text{Equation 4}$$

According to various embodiments, data to be transmitted by base station 401 is queued according to a scheduling algorithm 411 prior to precoding and transmission. Depending on the network architecture, scheduling algorithm 411 is implemented at a data unit (DU) of base station 401, a dedicated scheduling apparatus, an upstream processing platform of the core network (for example, CNE 403), or various combinations thereof. According to various embodiments, the processing platforms implementing scheduling algorithm 411 manage queues (for example, initial queues 413_a_, 413_b_ and 413_c_) of data to be transmitted to user equipment within coverage area 407 of base station 401. In certain embodiments, where a particular user equipment has more data in its queue relative to other user equipment served by the base station, its service level may be lower to the other user equipment, with its data remaining in a pre-transmission queue longer than that of companion devices. In other words, where a base station has finite transmission resources (i.e., a limited number of physical resource blocks) to be apportioned between a plurality of user equipment, the quality of service provided to a particular user equipment is fundamentally linked to how transmission resources are scheduled and data is queued for transmission. A UE whose data spends more time held in a pre-transmission queue, will, all other things being equal, generally receive lower quality service from base station 401.

As noted elsewhere in this disclosure, the expansion of devices connecting to 5G core networks means greater heterogeneity within the set of UEs served by a particular base station, with certain user devices having greater tolerance for slower service and reduced throughput than others. Given this growth in the number and variety of devices served by base station 401, rather than trying to optimize the performance of a network by ensuring that each UE gets the fastest service (as has historically been the objective of network optimization), network operators may instead seek to optimize the number of users connected to the network at a specified level of service.

Certain embodiments according to this disclosure provide mechanisms for optimizing the performance of networks according to ensuring across-the-board compliance with agreed-upon service level agreements, as an alternative, or in addition to, trying to maximize performance for all devices.

Referring to the non-limiting example of FIG. 4, in certain embodiments according to the present disclosure reports 415 of key performance indicators (KPIs) associated with SLA compliance from UEs within coverage area 407, as well as reports 417 of SLA-associated data from base stations are obtained to detect and forecast compliance with SLA agreements, and where appropriate, determine new scheduling parameters 419 for updating scheduling algorithm 411. In this way, the extent to which data for a particular UE is held in a pre-transmission queue at base station 401 (which, as discussed elsewhere herein, is associated with the quality of service to the UE), can be adjusted to ensure SLA compliance. For example, by providing scheduling algorithm 411 with updated parameters 419, the updated pre-transmission queue 421 for UE 1 shows less data being held in a pre-transmission queue.

FIG. 5 illustrates an example of a network slicing and scheduling architecture 500 for slicing network service and scheduling data according to network slices, according to various embodiments of this disclosure.

Referring to the illustrative example of FIG. 5, in certain embodiments, the determination of scheduling parameters (for example, implementing scheduling algorithm 411 in FIG. 4) is layered and split across multiple computing platforms. In this illustrative example, architecture 500 comprises three layers. A first layer comprising a Level 1 Scheduler 505 may be implemented at a RAN intelligent controller ("RIC"), wherein the RIC comprises a suite of software applications (for example, cloud-based applications) communicatively connected to base stations (for example, base station 401 in FIG. 4) and user equipment (through the base station), and configured to receive KPI and key quality indicator (KQI) from entities of the wireless network, and where applicable, outside network data vendors (for example, Irisview Software). In this explanatory example, Level 1 Scheduler 505 performs data-based updates of per-slice scheduling parameters to ensure that per-slice SLA requirements are satisfied. Examples of per-slice parameters determined by Level 1 Scheduler 505 include, without limitation, a maximum percentage of total PRBs allocatable to a slice, a minimum percentage of total PRBs allocatable to a slice, and per-slice/per-user scheduling priorities and weights. According to various embodiments, of the three layers of architecture 500, Level 1 Scheduler 505 operates at the coarsest level of temporal granularity, determining and updating per-slice scheduling parameters once every 500 ms. This example is for illustration only, and in some embodiments, Level 1 Scheduler 505 may operate at a different level of temporal granularity, pushing out updated per-slice scheduling more or less frequently than once every 500 ms.

Referring to the illustrative example of FIG. 5, architecture 500 further comprises Level 2 Scheduler 510. Depending on embodiments, Level 2 scheduler is implemented on one or more processing platforms of the base station, such as a data unit (DU) configured to pre-schedule and queue data to be passed to an MMU and transceiver for pre-coding and transmission. In this example, Level 2 Scheduler 510 is configured to monitor the occupancy of one or more pre-transmission buffers for specified UEs or slices (for example, buffers 413*a*-413*c* in FIG. 4) and determine whether UEs of a particular slice is to be given a maximum or minimum allocation of physical resource blocks dedicated for the slice based on the buffer occupancy over a specified time interval (such as a set number of transmission time intervals (TTIs)). In various embodiments, where the buffer occupancy exceeds a threshold value, then the slice is given a maximum allocation of dedicated PRBs. Similarly, where the buffer occupancy falls below a threshold value, then the slice is given a minimum allocation of dedicated PRBs. In this illustrative example, Level 2 Scheduler 510 operates at an intermediate level of temporal granularity compared to Level 1 Scheduler 505 and Level 3 Scheduler 515, performing buffer-analysis based PRB allocations once every 20 ms. Other embodiments are possible, in which a Level 2 Scheduler 510 pushes out allocation decisions faster or slower.

In certain embodiments, architecture 500 comprises a Level 3 Scheduler 515, which is located on or more processing platforms (for example, a DU) of base station, and schedules data to PRBs based on the scheduling parameters provided by Level 1 Scheduler 505 and the PRB allocation determined by Level 2 Scheduler 510. As will be discussed in greater detail herein, Level 3 Scheduler 515 performs resource allocation based on a weighted proportional fairness (PF) metric.

The technical challenges associated with ensuring slice-level SLA compliance include, without limitation, the fact that the mechanisms for scheduling (for example, hardware and software) used at many base stations are proprietary and can be tuned to provide various users with connectivity satisfying predefined Quality of Experience (QoE) classes. However, QoE classes do not necessarily map to the requirements and constraints specified by SLAs. Thus, the combination of proprietary systems and QoE-based tuning denies operators a built-in mechanism for tuning scheduling parameters at the slice level to ensure SLA compliance.

Figure 6:
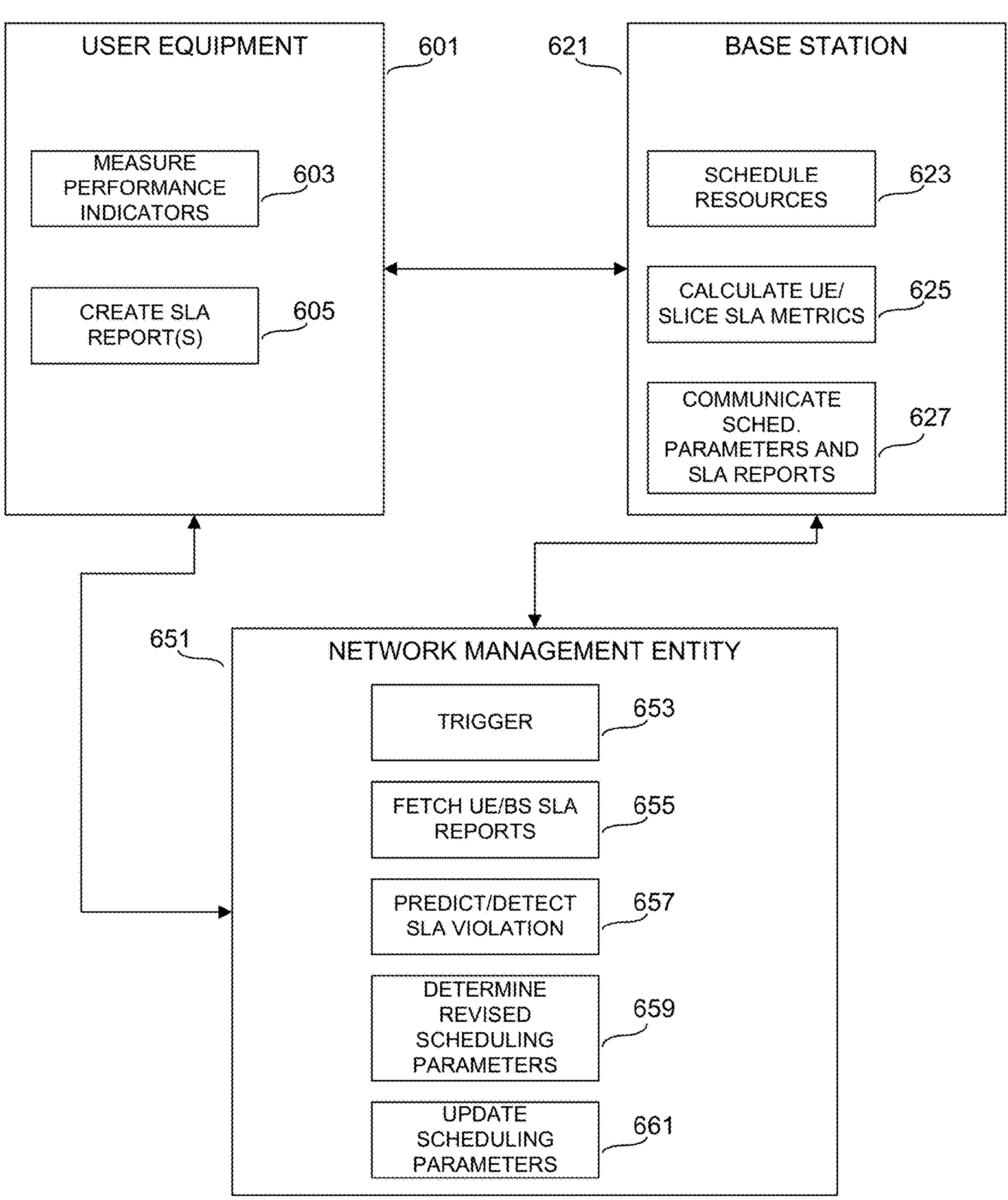
FIG. 6 illustrates a system architecture according to various embodiments of this disclosure.

FIG. 6 illustrates a system architecture 600 that, without limitation, provides mechanisms by which: a.) UEs belonging to different entities can report SLA-compliance relevant KPIs to a base station; and b.) a network management entity (NME) can predict a potential violation of one or more SLAs and take corrective action by determining and pushing out updated scheduling parameters to be used by one or more base stations serving UEs of a slice subject to the SLA.

The technical challenges associated with ensuring slice-level SLA compliance include, without limitation, the fact that the mechanisms for scheduling (for example, hardware and software) used at many base stations are proprietary and can be tuned to provide various users with connectivity satisfying predefined Quality of Experience (QoE) classes. However, QoE classes do not necessarily map to the requirements and constraints specified by SLAs. Thus, the combination of proprietary systems and QoE-based tuning denies operators a built-in mechanism for tuning scheduling parameters at the slice level to ensure SLA compliance.

FIG. 6 illustrates a system architecture 600 that, without limitation, provides mechanisms by which: a.) UEs belonging to different entities can report SLA-compliance relevant KPIs to a base station; and b.) a network management entity (NME) can predict a potential violation of one or more SLAs and take corrective action by determining and pushing out updated scheduling parameters to be used by one or more base stations serving UEs of a slice subject to the SLA.

Referring to the non-limiting example of FIG. 6, system architecture 600 comprises a user equipment (UE) 601, a base station 621 and a network management entity (NME) 651, wherein user equipment 601 is, at a minimum, communicatively connected to NME 651 through a base station 621. In this example, system architecture 600 is configured such that UE 601 belongs to a network slice whose connectivity to a core network through base station 621 is subject to SLA constraints. At block 603, UE 601 measures and stores measurements of performance indicators, specifically KPIs associated with compliance with SLA requirements. In response to one or more predefined conditions, such as receipt of a reporting trigger message, and the stored KPI data satisfying recency requirements, at block 605, UE 601 generates one or more SLA reports, which are provided to NME 651 via BS 621.

Base station 621 serves as an access point for UE 601 to access a core network comprising NME 651. According to various embodiments, at block 623, base station 621 schedules data to be transmitted to UE 601 according to SLA requirements based on scheduling parameters provided from NME 651. Further, at block 625, base station collects SLA-related KPI metrics from UE 601, as well as its own SLA-related metrics, such as user traffic metrics and the current scheduler parameters. As shown in FIG. 6, at block 627, base station 621 communicates revised scheduling parameters generated by, and received from NME 651 to UE, and provides SLA reports to NME 651.

Referring to the non-limiting example of FIG. 6, NME 651 can be embodied on a variety of computing platforms that either comprise a part of or are communicatively connected to a core network. In some embodiments, NME 651 is embodied on a cloud computing platform operating as a RAN intelligent controller. In some embodiments, NME 651 is embodied as part on a server or other processing platform (for example, CNE 403 in FIG. 4) connected to base station 621 through a backhaul link.

According to various embodiments, at block 653, NME 651 triggers SLA reporting. Depending on embodiments, SLA reporting may be triggered based on a temporal condition (for example, expiration of a timer) or detection of a condition (for example, registering a threshold number of UEs connecting through base station 621) associated with an enhanced risk of an SLA violation. In this example, at block 655, NME 651 fetches SLA data reports from UE 601 and base station 621. In some embodiments, fetching SLA data report comprises sending reporting trigger messages to base station 621, and to UE 601 via base station 621.

At block 657, NME 651 analyzes the data in the SLA reports to detect and/or predict SLA violations, and where appropriate, determines new scheduling parameters at block 659. According to various embodiments, at block 661, the updated scheduling parameters are then pushed out base station 621 and UE 601.

Figure 7:
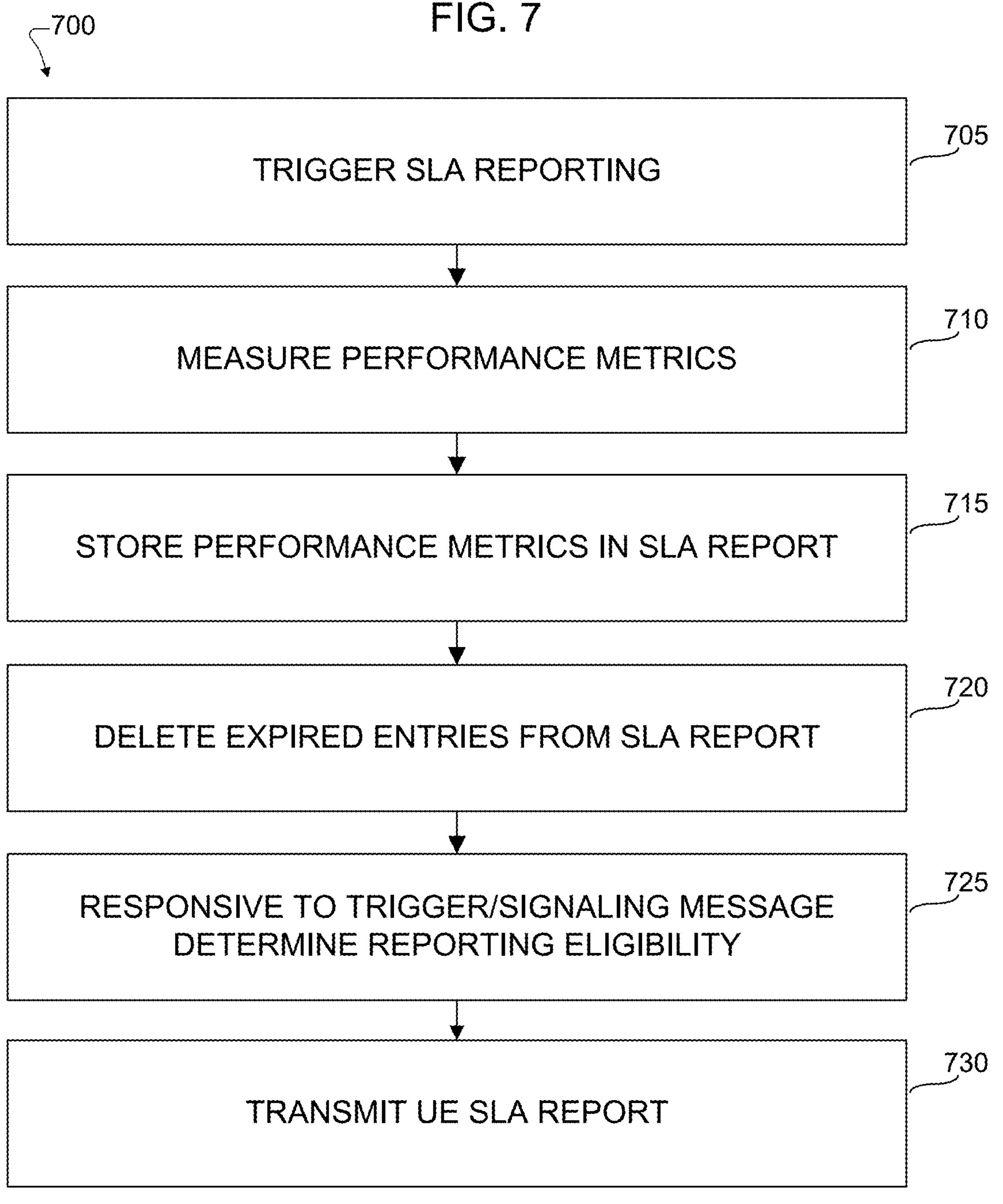
FIG. 7 illustrates operations of an example method by which a UE collects and generates SLA reports, according to various embodiments of this disclosure.

FIG. 7 illustrates operations of an example method 700 by which a UE (for example, UE 300 in FIG. 3 or UE 601 in FIG. 6) collects and generates SLA reports, according to various embodiments of this disclosure. In this example, method 700 is performed by a UE whose connectivity to a core network through a base station (for example, base station 621 in FIG. 6) is subject to SLA-specified constraints.

Referring to the illustrative example of FIG. 7, at block 705, a UE SLA reporting process is triggered. In some embodiments, SLA reporting is triggered by one or more of successful decoding of a reference signal, a timing trigger (for example, expiration of a timer setting an SLA reporting interval), or a trigger message being sent from an NME (for example, NME 651 in FIG. 6) instructing to the UE to, if permissible, provide an SLA report. In some embodiments, the trigger message may contain a value of T specifying a reporting time interval for generating averaged values of metrics to be included in an SLA report.

According to various embodiments, responsive to the UE SLA reporting process being triggered at block 705, at block 710, the UE measures a specified set of metrics of SLA-related performance metrics (also referred to as key performance indicators, or KPIs). According to various embodiments, these metrics include a reference signal strength metric (RSSI), a channel quality index metric $CQI_u(t)$, a downlink throughput metric Ru(t), a downlink latency metric $\mathcal{L}_u(t)$, and a metric $Pdrop_u(t-\delta)$ quantifying the fraction of dropped packets. Some of the metrics obtained at block 710 may be measured directly, while others may be specified as an average computed over a time window T For example, average downlink throughput may be determined according to Equation 5, below:

$$\overline{R}_u(t) = \Sigma_{\delta=0}^{T} R_u(t-\delta)/_T \quad \text{Equation 5}$$

Similarly, the average latency over the specified time window T may be given by Equation 6, below:

$$\overline{\mathcal{L}}_u = 98\% \text{ tile}\left(\bigcup_{0\le\delta<T} \mathcal{L}_u(t-\delta)\right) \quad \text{Equation 6}$$

Still further, the average packet drop rate over time window T may be given by Equation 7, below:

$$\overline{Pdrop_u}(t) = \Sigma_{\delta=0}^{T} Pdrop_u(t-\delta)/_T \quad \text{Equation 7}$$

According to various embodiments, at block 715, the measured performance metrics are stored as part of a UE SLA report. In some embodiments, in addition to the performance metrics obtained at block 715, the UE SLA report may further comprise a time stamp and an identifier of the slice index to which the reporting UE belongs. According to various embodiments, at block 720, a first check of data within SLA report is performed, to delete metrics whose time stamp fails to satisfy specified recency criteria.

Further, in some embodiments, where UE SLA reporting is triggered by a trigger message passed from the NME via the base station, at block 725, a second time check, comparing the time stamp of the trigger message against the time stamp of the SLA report to determine whether the SLA report generated by the UE corresponds to a reporting period indicated by the received trigger message. Where the difference between the time stamp of the SLA report and the received trigger message exceeds a specified threshold (for example, when the trigger message was received too late), the SLA report is discarded and method 700 terminates.

Where there is no temporal discrepancy between a trigger message (for example, due to UE level SLA reporting being triggered at the UE, or where a trigger message is timely received), method 700 proceeds to block 730, wherein the UE transmits a UE SLA report to the network management entity.

FIG. 8 illustrates operations of an example method 800 for scheduling resources and collecting SLA report data at a base station according to various embodiments of this disclosure. The operations described with reference to FIG. 8 may be performed in whole or in part by one or more computing processing platforms (for example, a data unit) within a base station (for example, base station 202 in FIG. 2).

Referring to the non-limiting example of FIG. 8, at block 805, the base station serves and schedules resources for data to be sent to one or more UEs (for example, UE 601 in FIG. 6) belonging to a network slice with connectivity requirements specified by an SLA. Depending on embodiments, the resource scheduling performed at block 805 is implemented by one or more of a Level 2 scheduler (for example, Level 2 Scheduler 510 in FIG. 5) and a Level 3 Scheduler (for example, Level 3 Scheduler 515 in FIG. 5). In certain embodiments, the base station components performing block 805 implement a weighted proportional fairness (PF) scheduling algorithm which schedules data for transmission according to the configurable parameters set forth in Table 1, below:

TABLE 1

| Parameter | Description |
|---|---|
| Max_alloc ($M_s$) | When user queues for a given slice are non-empty, Max_alloc specifies a fraction of PRBs that will be reserved for users of slice s for the next time window (for example, 21 TTIs). In some embodiments, Max_alloc has a range of values from 0-1. |
| Min_alloc ($m_s$): | When user queues for a given slice are empty, Min_alloc specifies a fraction of PRBs that will be reserved for users of slice s for the next time window (for example, 21 TTIs). In some embodiments, Min_alloc has a range of values from 0-1. |
| User Weight ($W_u$) | This parameter sets intra-slice weight among the users of a slice In some embodiments, User Weight has a range of values from 1-16. |
| Slice weight ($\omega_s$): | This parameter sets inter-slice priorities among slices served a base station In some embodiments, Slice weight has a range of values from 1-16. |

According to various embodiments, at block 810, the base station measures performance metrics. Depending on embodiments, the performance metrics may be obtained on a per-UE basis, or as an average across UEs belonging to a common slice. Examples of performance metrics for a given UE u include, without limitation, an average packet arrival rate $\overline{A}_u(t)$ determined across a measurement window T, and an average physical resource block (PRB) allocation $$\overline{B}_u^{all}$$

over measurement window T In various embodiments, the average packet arrival rate may be determined according to Equation 8, below:

$$\overline{A}_u(t) = \Sigma_{\delta=0}^{T} A_u(t-\delta)/_T \quad \text{Equation 8}$$

Similarly, the average PRB allocation over measurement window T may be given by Equation 9, below:

$$\overline{B}_u^{all}(t) = \Sigma_{\delta=0}^{T} B_u^{all}(t-\delta)/_T \quad \text{Equation 9}$$

Referring to the illustrative example of FIG. 8, at block 815, the base station is triggered (for example, by receiving a UE SLA report trigger message from an NME, upon expiration of a reporting timer, or in response to satisfaction of a predefined condition) to fetch UE SLA reports from UEs (for example, UE 601 in FIG. 6) served by the base station. Responsive to receipt of a reporting trigger message or expiration of a timer at block 815, at block 820, the base station sends messages signaling a request for UE SLA reports (for example, the UE SLA report stored at block 715 in FIG. 7). According to various embodiments, at block 825, the base station collects UE SLA reports sent to the base station (for example, the UE SLA report transmitted at block 730 of FIG. 7). As previously noted, the UE SLA reports may include, without limitation, the following items of information: (i) a time stamp of the report, (ii) a reference signal reception power (RSRP) value for the serving BS (for example, base station 621 in FIG. 6), (iii) channel quality index for the link between the base station and the UE, (iv) a value of a downlink throughput metric (v) a value of an uplink throughput metric, (vi) a value of a downlink latency metric, (vii) a value of an uplink latency metric, (viii) a downlink packet drop probability, (ix) an uplink packet drop probability, and an (x) an identifier for the user slice index.

As shown in the explanatory example of FIG. 8, at block 830, the base station pre-processes the UE SLA reports and combines the pre-processed UE SLA report data with the performance metrics obtained at the base station (for example, metrics obtained at block 810) to create a combined, or augmented SLA report to be provided to an NME. According to various embodiments, pre-processing at block 830 comprises identifying and removing faulty, corrupted or unwanted UE SLA reports. Further in some embodiments, pre-processing at block 830 further comprises reducing the volume of UE SLA data. In some embodiments, to reduce the size of the BS SLA report or the augmented SLA report, the BS may preprocess entries to return a single representative number for each parameter and slice combination. For example, instead of including the user packet arrival metrics for all users of a slice (i.e., $\{\overline{A}_u(t)|u\in \mathcal{U}_s\}$), the volume of data to be reported can be reduced by instead using a single value corresponding to the 50th percentile rate across users (i.e., $\overline{A}^{50\%}(t)=50\%\ \text{tile}(\cup_{u\in\mathcal{U}_s}\overline{A}_u(t))$). The same approach of reducing UE SLA data by reporting median values for slices can be used to reduce the volume of UE level data in an augmented SLA report.

According to certain embodiments, at block 835, upon receiving a second trigger, the BS may forward the BS SLA report or the augmented SLA report to a network management entity to analyze SLA assurance performance.

Figure 9:
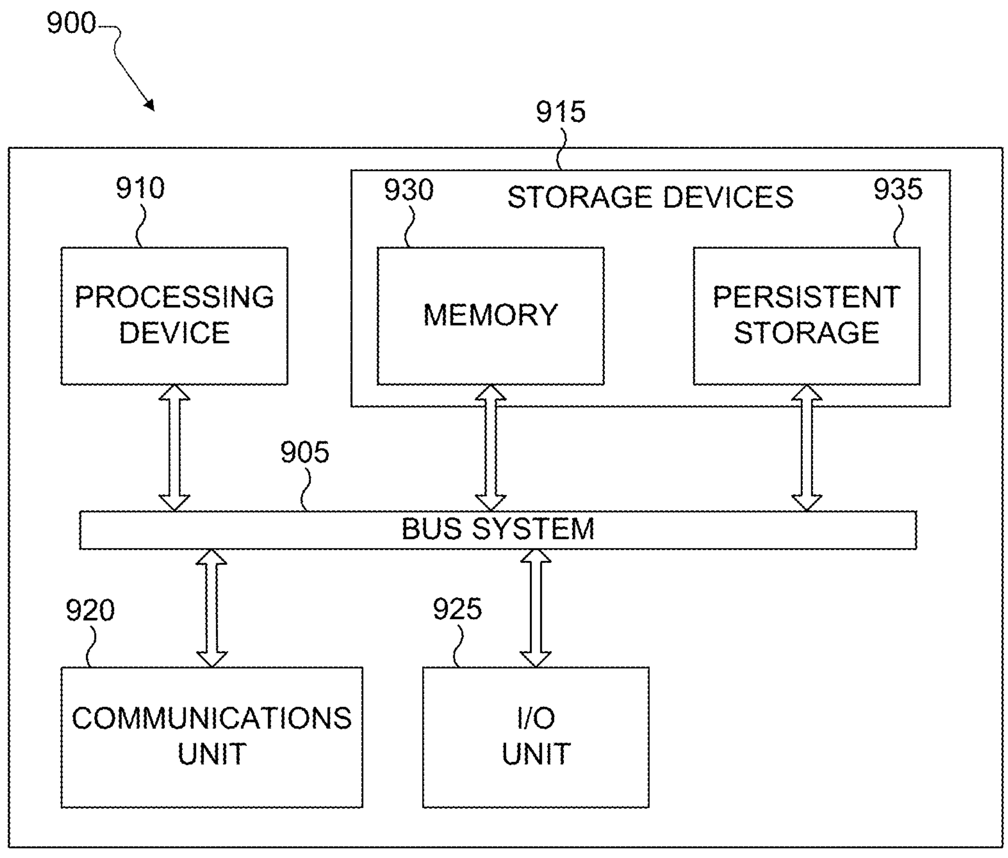
FIG. 9 illustrates an example of a network management entity (NME) according to certain embodiments of this disclosure.

FIG. 9 illustrates an example of a network management entity (NME) 900 according to certain embodiments of this disclosure. Depending on embodiments, NME 900 can be implemented as part of a base station (for example, base station 401) or as a core network entity (for example, CNE 403 in FIG. 4). The embodiment of NME 900 shown in FIG. 9 is for illustration only and other embodiments could be used without departing from the scope of the present disclosure. According to certain embodiments, NME 900 is communicatively connected to base stations of a wireless network and provide user plane controls and handle network management operations.

In the example shown in FIG. 9, NME 900 includes a bus system 905, which supports communication between at least one processing device 910, at least one storage device 915, at least one communications unit 920, and at least one input/output (I/O) unit 925.

The processing device 910 executes instructions that may be loaded into a memory 930. The processing device 910 may include any suitable number(s) and type(s) of processors or other devices in any suitable arrangement. Example types of processing devices 910 include microprocessors, microcontrollers, digital signal processors, field programmable gate arrays, application specific integrated circuits, and discrete circuitry.

The memory 930 and a persistent storage 935 are examples of storage devices 915, which represent any structure(s) capable of storing and facilitating retrieval of information (such as data, program code, and/or other suitable information on a temporary or permanent basis). The memory 930 may represent a random-access memory or any other suitable volatile or non-volatile storage device(s). The persistent storage 935 may contain one or more components or devices supporting longer-term storage of data, such as a ready only memory, hard drive, Flash memory, or optical disc.

The communications unit 920 supports communications with other systems or devices. For example, the communications unit 920 could include a network interface card or a wireless transceiver facilitating communications over a network. The communications unit 920 may support communications through any suitable physical or wireless communication link(s).

The I/O unit 925 allows for input and output of data. For example, the I/O unit 925 may provide a connection for user input through a keyboard, mouse, keypad, touchscreen, or other suitable input device. The I/O unit 925 may also send output to a display, printer, or other suitable output device. While network management apparatus 900 has been described with reference to a standalone device, embodiments according to this disclosure are not so limited, and network management entity 900 could also be embodied in whole, or in part, on a cloud or virtualized computing platform. Additionally, in some embodiments, network management entity 900 may be embodied across multiple computing platforms, such as split architecture 500 in FIG. 5, with some operations performed by a processing platform (for example, a data unit) of a base station, and other operations performed at one or more servers or processing platforms (for example, a RAN intelligent controller ("RIC")) of a core network. In certain embodiments, NME 900 may be embodied in a hybrid physical/virtualized processing environment comprising a data unit at a base station operating as a Level 3 scheduler, a virtualized platform providing a real-time RIC operating as a Level 2 scheduler, and a virtualized platform providing a non-real-time RIC operating as a Level 1 scheduler.

Figure 10A:
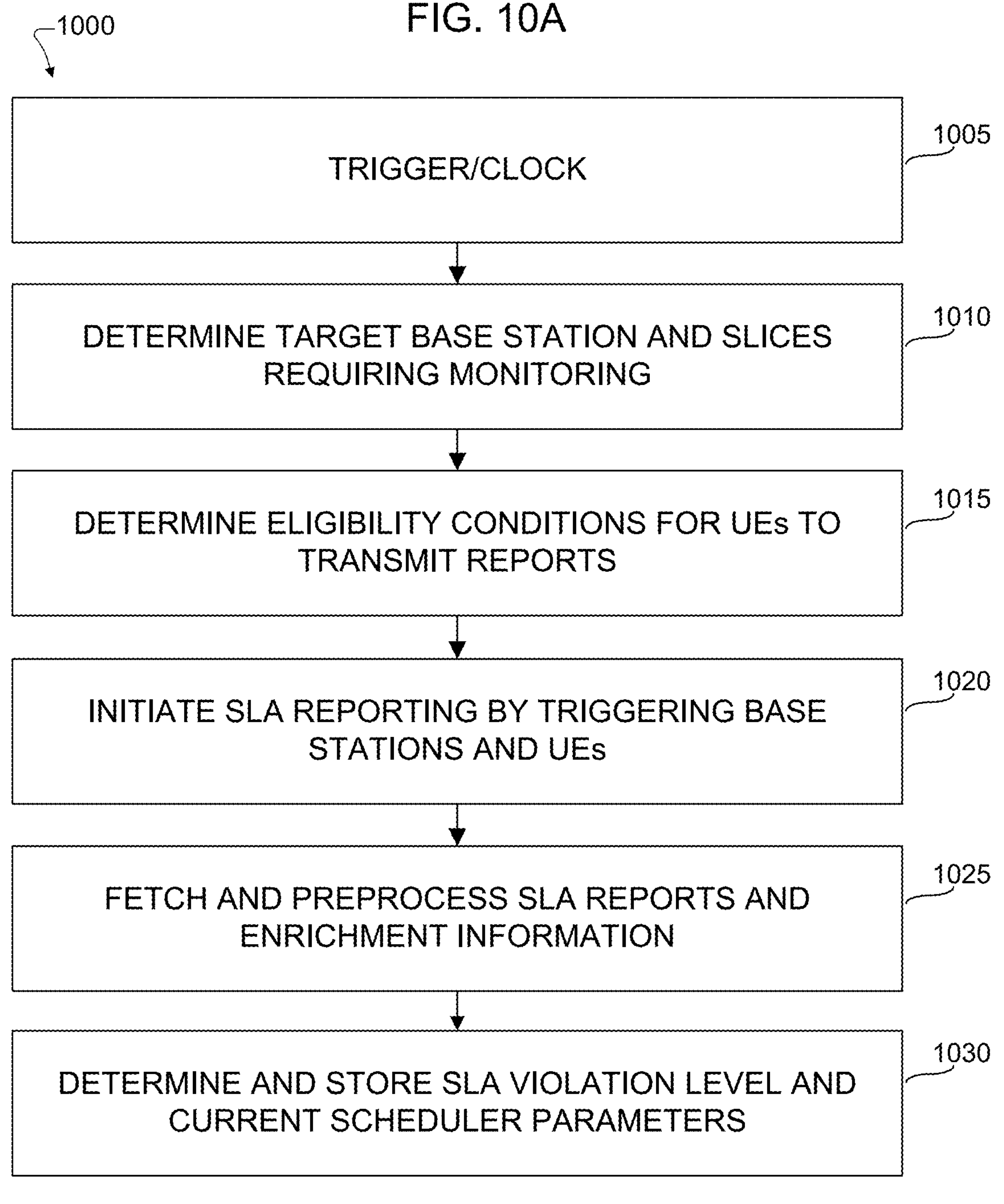
FIGS. 10A and 10B illustrate operations of an example method for calculating SLA violations and generating scheduling parameter updates, according to various embodiments of this disclosure.
Figure 10B:
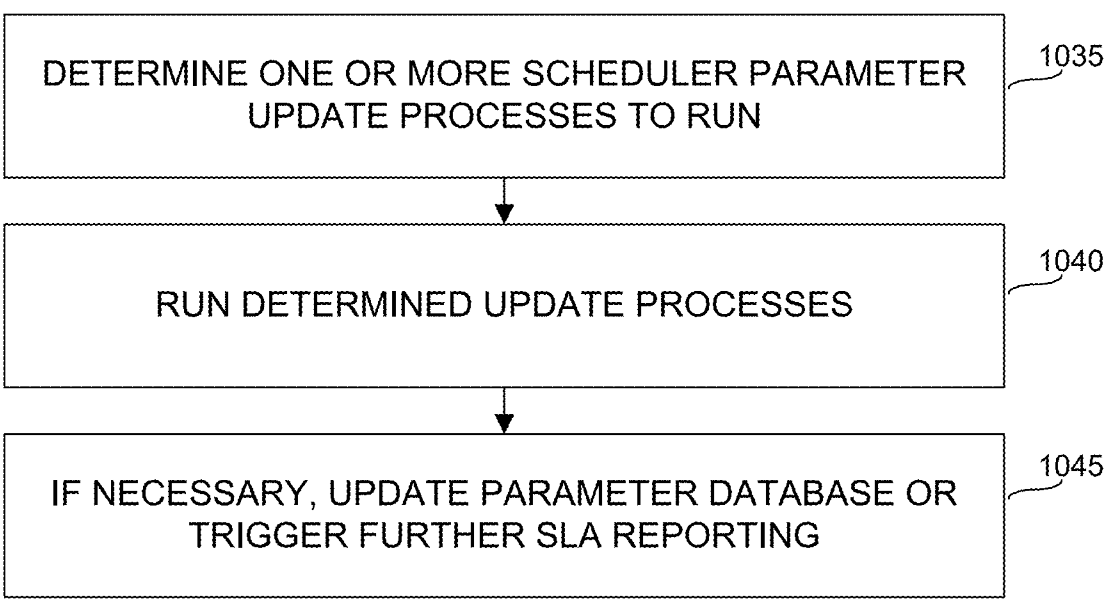

FIGS. 10A and 10B illustrate operations of an example method 1000 for calculating SLA violations and generating scheduling parameter updates, according to various embodiments of this disclosure. The operations described with reference to FIGS. 10A and 10B may be performed at any suitably configured processing platform, such as, NME 900 in FIG. 9, or a processing platform embodying architecture 500 in FIG. 5.

Referring to the non-limiting example of FIG. 10A, at block 1005, the process of monitoring SLA compliance is initiated. In some embodiments, the process is initiated by the NME receiving a trigger message from another network entity. In some embodiments, the process of monitoring SLA compliance is initiated through expiration of a timer set upon completion of the last SLA monitoring cycle. In various embodiments, the process of monitoring SLA compliance is initiated manually, for example, in response to an operator input.

According to various embodiments, at operation 1010, the NME identifies specific base station(s) and slice(s) for SLA compliance monitoring. Depending on embodiments, operation 1010 may proceed according to rules or scheduling information maintained at the NME (for example, rules specifying a minimum frequency at which certain slices/base stations need to be monitored or SLA compliance). In various embodiments, the determination of slices and base stations for SLA compliance monitoring is determined based on individual timers set for each slice and base station, such that slice(s) and base station(s) whose monitoring timers have expired are selected for updated monitoring.

As shown in the explanatory example of FIG. 10A, at operation 1015, the NME may determine eligibility conditions for UEs to transmit SLA reporting data. According to various embodiments, the operations of operation 1015 may comprise filtering out UEs associated with conditions that may confound SLA compliance analyses, such as being located at the periphery of a service area of a base station, or being simultaneously served (for example, through carrier aggregation or the like) by multiple base stations, where one base station is controlled by the NME, and another base station is controlled by a separate NME.

According to various embodiments, at operation 1020, the NME initiates SLA reporting by connected base stations and eligible UEs served by the base station by pushing out reporting trigger messages (for example, the triggers described with reference to blocks 815 and 835 of FIG. 8, and block 705 in FIG. 7) which are received by base stations and UEs, and in response to receiving same, initiate the respective SLA reporting processes (for example, the processes described with reference to FIGS. 7 and 8 herein) of the base stations and UEs.

Referring to the non-limiting example of FIG. 10, at block 1025, the NME fetches the reports from the base stations and UEs for which SLA reporting was initiated at operation 1020. Depending on embodiments and the network context (i.e., how the constituent devices of the network are connected), the SLA reports from the UEs may be received indirectly from a base station, or where a UE has a separate connection to the core network (for example, a Wi-Fi connection), the UE SLA reports may be received directly. According to various embodiments, the SLA reports from the base station may be received via a backhaul link connecting the base station to a node of the core network (for example, CNE 403 in FIG. 3).

According to some embodiments, at block 1025, the NME may also pre-process the received SLA information by filtering out faulty, corrupted or otherwise unwanted/unusable SLA reports. Further, at block 1025, the NME may preprocess the received SLA reports by adding radio access network (RAN) enrichment information (for example, UE location, UE speed, or tertiary information from a slice manager) collected from nodes of the network other than the UEs or base stations providing SLA reports. According to various embodiments RAN enrichment information comprises at least one of a future traffic prediction, a location, a velocity, or information from a slice manager.

As shown in FIG. 10A, at operation 1030, the NME calculates a value of an SLA violation metric based on the information in the pre-processed SLA reports to determine the presence of SLA violation(s) or an enhanced probability of one or more SLA violations. In some embodiments, the presence or probability of an SLA violation may be determined as follows:

In certain embodiments, the reporting base station(s) and reporting UEs jointly collect a common plurality of metrics for time steps $t \in \{0, \hat{T}, 2\hat{T}, 3\hat{T} \ldots\}$. In this example, the collected metrics may include $\bar{R}_u(t)$, a rate metric representing average rate over past T time steps/TTIs (in bits/ms). The collected metrics may further comprise $\bar{L}_u(t)$, a latency metric representing 98% latency over past T time steps/TTIs (in ms). Additionally, the common plurality of metrics may include $\bar{A}_u$, an arrival rate metric representing average packet arrival rate over past T time steps/TTIs (in bits/ms). Further, in some embodiments, the collected metrics may include $$\bar{B}_u^{all},$$

representing a fraction of physical resource blocks (PRBs) allocated to a user on average over the past T time steps/TTIs. As discussed with reference to Equations 3 and 4 of this disclosure, compliance with SLA constraints may be expressed based on the mean or other parameter of a distribution of UEs whose service falls within a designated portion of a distribution of the metrics of interest. For example, violation of a rate-per-slice SLA constraint may be determined based on the value of $$\hat{R}_s^{10}$$

according to Equation 10, below relative to a threshold value:

$$\hat{R}_s^{10} = 10\% \text{ tile}\left(\bigcup_{u \in \mathcal{U}_s} \bar{R}_u(t)\right) \quad \text{Equation 10}$$

Similarly, violation of a latency-per-slice SLA constraint may be determined by comparing a current value of $$\hat{L}_s^{90}$$

according to Equation 11 below relative to a threshold:

$$\hat{L}_s^{90} = 90\% \text{ tile}\left(\bigcup_{u \in \mathcal{U}_s} \bar{L}_u(t)\right) \quad \text{Equation 11}$$

Further, violation of a per-slice PRB allocation SLA constraint may be determined based upon a comparison of $\ddot{B}_s^{all}$ according to Equation 12 below, relative to a threshold value:

$$\ddot{B}_s^{all} = \sum_{u \in \mathcal{U}_s} \bar{B}_u^{all} \quad \text{Equation 12}$$

While Equations 10-12 above define circumstances constituting SLA violations, in some embodiments, these equations could be modified (for example, by adjusting the thresholds for violation) to identify metric values that, while not yet violative of an SLA constraint, indicate a risk or elevated property of such a violation.

Referring to the non-limiting example of FIG. 10, at operation 1030, the NME (or an architecture implementing scheduling, such as architecture 500 in FIG. 5) determines the current scheduler parameters. As discussed with reference to Table 1 of this disclosure, in certain embodiments, a scheduler, or scheduler architecture controls a plurality of configurable scheduling parameters, which may include, without limitation, Max_alloc ($M_s$), User Weight ($W_u$), and Slice Weight ($\omega_s$). According to various embodiments, scheduling of data for a given UE belonging to a specific slice may be determined at operation 1030 on a weighted proportional fairness (wPF) basis, with the wPF metric for a UE u at a time t on a PRB b determined as according to Equation 13, below:

$$PF_{u,b} = W_u \omega_u SE_u(t, b)/R_{av,u} \quad \text{Equation 13}$$

Where $SE_u(t,b)$ is the instantaneous spectral efficiency of UE u at time t and PRB b and $R_{av,u}$ is the average rate for UE u. Note that if the PRBs allocated to UE u at time step t is $\mathcal{B}$ then: $R_{av,u}=(1-\alpha)R_{av,u}+R_u(t)$ and $R_u(t)=\beta\sum_{b \in \mathcal{B}} SE_u(t,b)$, where $\alpha$, $\beta$ are scalar constants. In each window of several TTIs, PRBs are allocated to UEs with the best wPF metric, as determined by Equation 13. In one example, the window is of 21 TTIs. However, towards the end of each 21 TTI window the scheduler ensures that UE of each slice s get a dedicated fraction of dedicated resources $M_s$.

Figure 11:
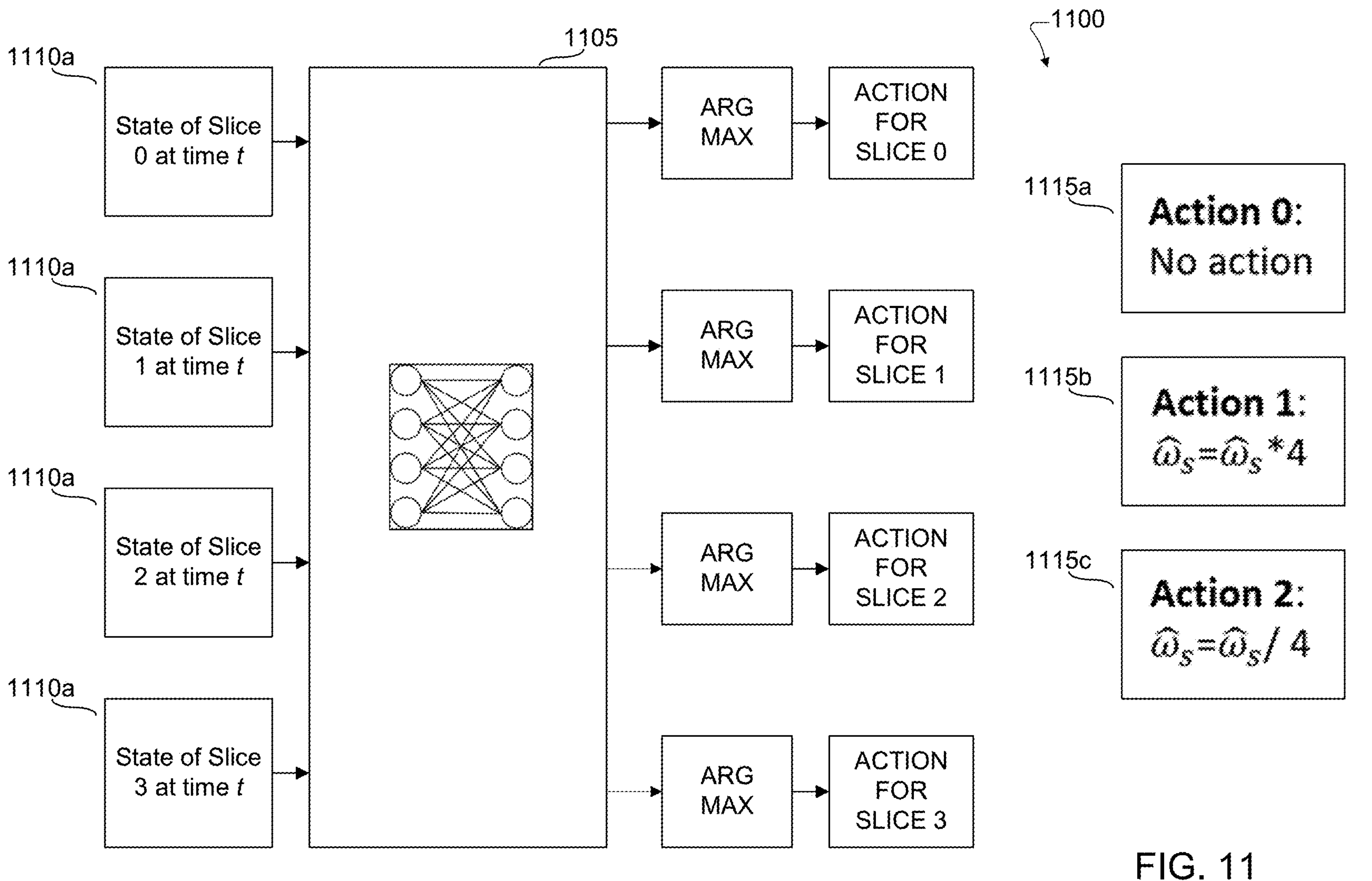
FIG. 11 illustrates, in block diagram format, an example of a deep learning method for updating scheduler parameters to ensure SLA compliance, according to various embodiments of this disclosure.

Referring to the explanatory example of FIG. 10B, at operation 1035, the NME determines or selects one or more scheduler update parameter processes (for example, the processes descried with reference to FIGS. 11 and 12 of this disclosure). In some embodiments, the selection of scheduler parameter update processes may be determined based upon the nature of the SLA violation (i.e., where an SLA specifies multiple constraints, choosing an update processes mapped to the out-of-agreement constraint). In some embodiments, selection of the scheduler parameter may be based on a systematic constraint, such as the availability of processing resources, or a hierarchy of default rules for selecting an update process.

According to various embodiments of this disclosure, at block 1040, the NME runs the one or more processes for determining updated scheduling parameters, and at operation 1045, pushes out (for example, through a message sent to a backhaul link to one or more base stations) the updated scheduling parameters. Depending on various embodiments, at operation 1045, the NME also triggers one or more further SLA reporting processes (for example, to determine or confirm that the SLA violation or probability of SLA violation has been resolved).

FIG. 11 illustrates, in block diagram format, an example of a deep learning method 1100 for updating scheduler parameters to ensure SLA compliance (for example, a process implemented at block 1040 of FIG. 10B), according to various embodiments of this disclosure. According to various embodiments, method 1100 may be performed at one or more processing platforms (for example, Level 1 Scheduler 505 in FIG. 5 or NME 651 in FIG. 6) configured to determine updated, SLA-compliant scheduler parameters.

According to certain embodiments, the determination of updated scheduler parameters may be modeled as a reinforcement learning problem, for which there is no previously known ground truth for the best action to be taken in response to a given SLA violation scenario. Accordingly, in certain embodiments of method 1100, a neural network 1105 (for example, a deep queue learning network (DQN)) is constructed, wherein neural network 1105 takes, as inputs, values of parameters representing the current state of each slice at a given time step. Examples of parameters representing the state of a slice include, without limitation, parameters specified in SLA report data (for example, parameters specified by the enriched SLA data fetched at block 1025 of FIG. 10A). Examples of parameters whose per-time step values may be provided to neural network 1105 as representative of the state of a slice at a given time include, without limitation, $$\hat{R}_s^{10}, \hat{L}_s^{90} \text{ and } \dddot{B}_s^{all}$$

as described with reference to Equations 10-12 of this disclosure. As shown in the example of FIG. 11, for each of slices 0-3, neural network 1105 is provided with a set of inputs 1110*a*-1110*d* providing a common set of metrics representing the state of the slice across a time step. According to various embodiments, the time steps correspond to a transmission time interval. In some embodiments, time steps correspond to the calculation interval (for example, the 1, 20 or 500 ms increments) of one or more layers of the pre-scheduler.

For each slice, a set of candidate actions, comprising changes to one or more scheduling parameters are defined. Examples of actions include, without limitation, increasing $M_s$ by a predetermined increment, decreasing $M_s$ by a predetermined increment, increasing $\omega_s$ by a predetermined increment, or decreasing $\omega_s$ by a predetermined increment. In the illustrative example of FIG. 11, three actions 1115*a*-1115*c* are shown in the figure. Thus, in a case where the inputs provided to neural network 1105*a* are $$\hat{R}_s^{10}, \hat{L}_s^{90} \text{ and } \dddot{B}_s^{all}$$

3S (where S is the number of slices) inputs are provided to the model, and the actions for each slice are actions 1115*a*-1115*c* shown in FIG. 11, there are 3S actions output by neural network 1105.

According to certain embodiments, neural network 1105 is a DQN network, which is trained according to one or more reward functions correlating the action (i.e., the change of one or more scheduler parameters) with the effect on the state of the slice at a predetermined interval (for example, 500 TTI) after implementing the action. Equations 14-16 below provide three examples of reward functions for quantifying the effects of actions based on the probabilities of a:) violating an SLA rate constraint (for example, the rate constraint described with reference to Equation 10) and b.) violating an SLA latency constraint (for example, the latency constraint described with reference to Equation 11) in order to perform reinforced learning.

$$\sum_s \left(\mathbb{P}\mathrm{r}_s(\text{rate viol})^2 + \mathbb{P}\mathrm{r}_s(\text{latency violation})^2\right) \quad \text{Equation 14}$$

$$\sum_s \left(\mathbb{P}\mathrm{r}_s(\text{rate viol}) + \mathbb{P}\mathrm{r}_s(\text{latency violation})\right) \quad \text{Equation 15}$$

$$\max_s \mathbb{P}\mathrm{r}_s(\text{rate viol}) - \max_s \mathbb{P}\mathrm{r}_s(\text{latency violation}) \quad \text{Equation 16}$$

By calculating reward values across a historical corpus of state data of a slice, neural network 1105 can be trained according to a maximization function (for example, argmax) of the reward function such that connections between states and actions having the highest reward are reinforced, while actions associated with lesser or negative rewards are demoted.

Once trained, neural network 1105 can be used to determine actions associated with real-time SLA data provided in reports from the NME (for example, data provided in SLA reports fetched at operation 1030). Subsequently, the NME calculates values representing the state of each slice based on the received SLA report data, wherein the values representing the state of each slice correspond to the features of neural network 1105. Subsequently, neural network 1105 may output a vector representing weighting values for each of the candidate actions. According to certain embodiments, the scheduling parameters for each slice are updated based on the candidate action having the highest weighting value, and the updated scheduling parameters may be used for a predefined interval (for example, one 500 ms cycle of Level 1 Scheduler 505 in FIG. 5).

Figure 12A:
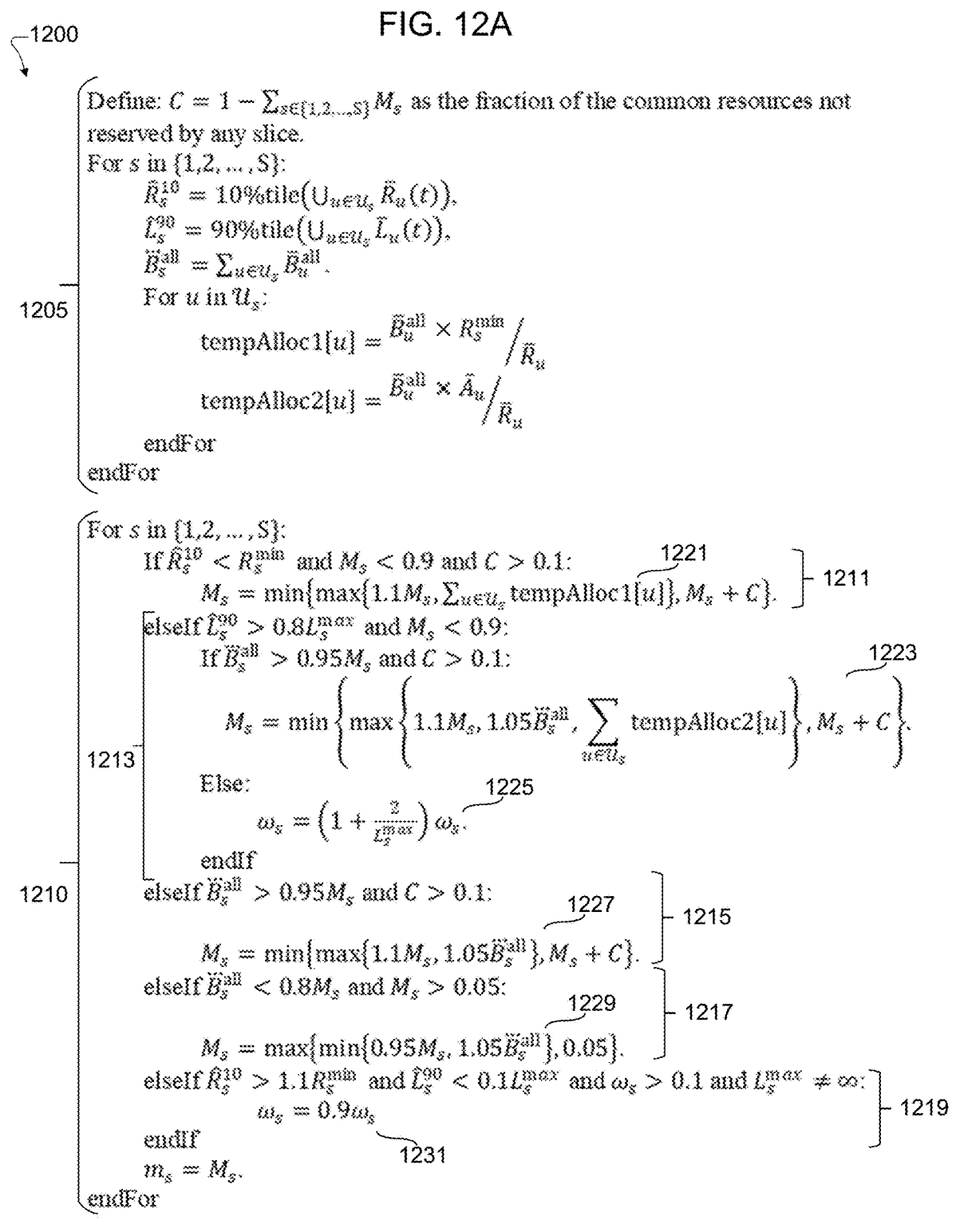
Figure 12B:
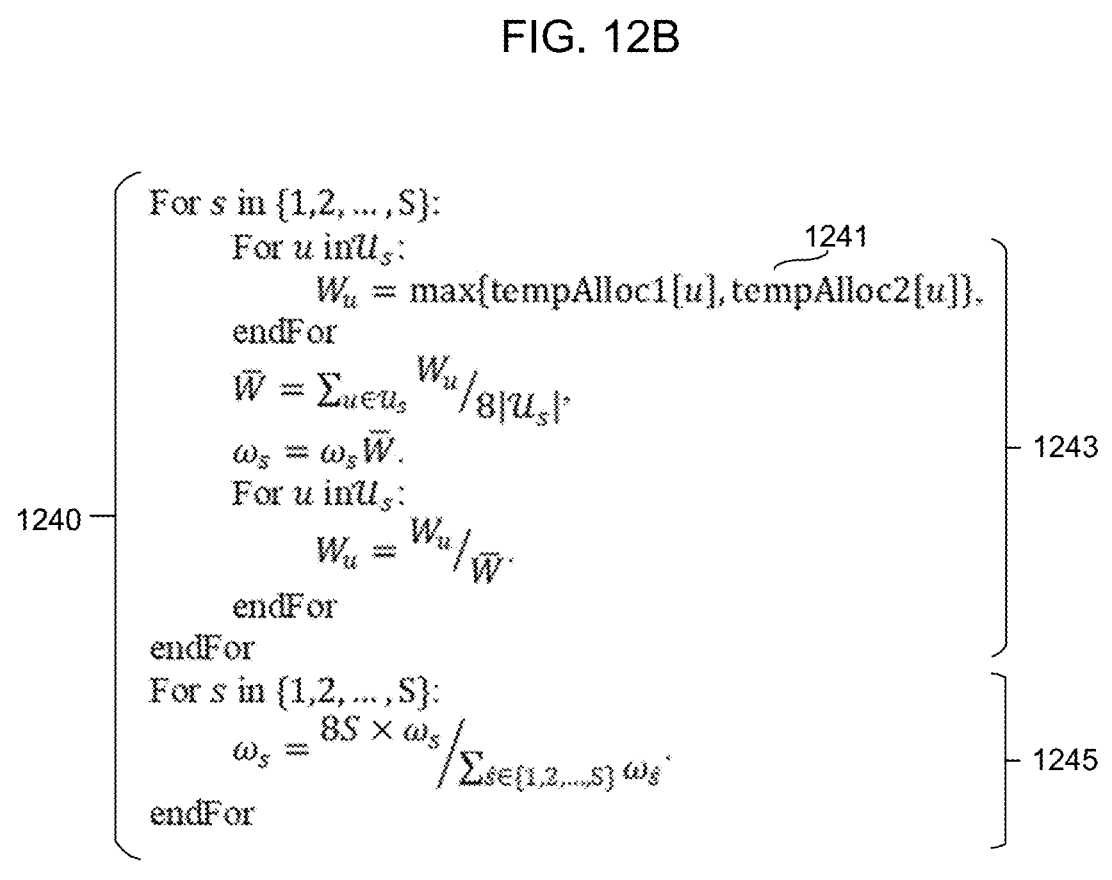

FIGS. 12A and 12B illustrate, through pseudocode, an example of a rules-based method 1200 for determining updated scheduler parameters according to various embodiments of this disclosure. According to various embodiments, code embodying the logic described with reference to the pseudocode shown in FIGS. 12A-12B is embodied at an NME or other processing platform (for example, Level 1 Scheduler 505 in FIG. 5) setting per-slice scheduling parameters.

Referring to the non-limiting example of FIG. 12A, at section 1205, the metrics $$\hat{R}_s^{10}$$

(here, as in FIG. 11, a rate metric), $$\hat{L}_s^{90}$$

(here, as in FIG. 11, a latency metric), and $\dddot{B}_s^{all}$ (here, as in FIG. 11, a PRB allocation metric) specifying the state of a slices at time t are defined. Further, tempAlloc1[u], which quantifies the reserved PRB allocation required to achieve a minimum SLA-compliant data rate for UE u of the set of UEs U, and tempAlloc2[u], which quantifies the reserved PRB allocation required to achieve an SLA-compliant average packet arrival time for UE u of the set of UEs U, are specified.

As shown in the explanatory example of FIG. 12A, section 1210 describes the logic for determining updated values of max_alloc ($M_s$) and slice weight ($\omega_s$) of each slice s of slices {1, 2, . . . S}. As shown FIG. 12A, section 1210 comprises a decision tree of rules formulated as "if"-"else if" (elif) statements (for example, statements, 1211, 1213, 1215, 1217 and 1219) which to see whether the metrics specified in section 1205 satisfy predefined criteria. Where the predefined criteria are satisfied, the statement further specifies an adjustment to either the current value of max_alloc or slice weight to be taken. In this illustrative example, statement 1211 specifies that if the minimum data rate specified by the ALS is not achieved for slice s, the value of max_alloc for slice s is increased to satisfy equation 1221. As shown in FIG. 12A, statement 1213 specifies that, if the maximum latency SLA constraint is not achieved, and the value of $\ddot{B}_s^{all}$ is greater than max_alloc, then max_alloc is adjusted to satisfy equation 1223 or the slice weight is adjusted according to equation 1225. According to some embodiments, statement 1215 indicates that, if all SLA constraints are satisfied, but $\ddot{B}_s^{all}$ is greater than max_alloc, max_alloc is tuned to satisfy equation 1227. According to various embodiments, statement 1217 specifies that, if all SLA constraints are satisfied, but $\ddot{B}_s^{all}$ is significantly lower than max_alloc, max_alloc is reduced to satisfy equation 1229. In certain embodiments according to this disclosure, statement specifies that is all SLA constraints are satisfied by a significant margin (i.e., where slice s is over-performing), the slice weight is set according to equation 1231.

Referring to the non-limiting example of FIG. 12B, section 1240 describes an example of rules-based control logic for adjusting user weights $W_u$ for each UE u of the set of UEs $\mathcal{U}_s$ in each slice s. At line 1241, the per UE user weight $W_u$ is defined. In section 1243, the control logic specifies normalizing the values of $W_u$ based on the slice weight $\omega_s$. Further, at section 1245, the slice weights are further normalized such that the average slice weight is 8.

Figure 13:
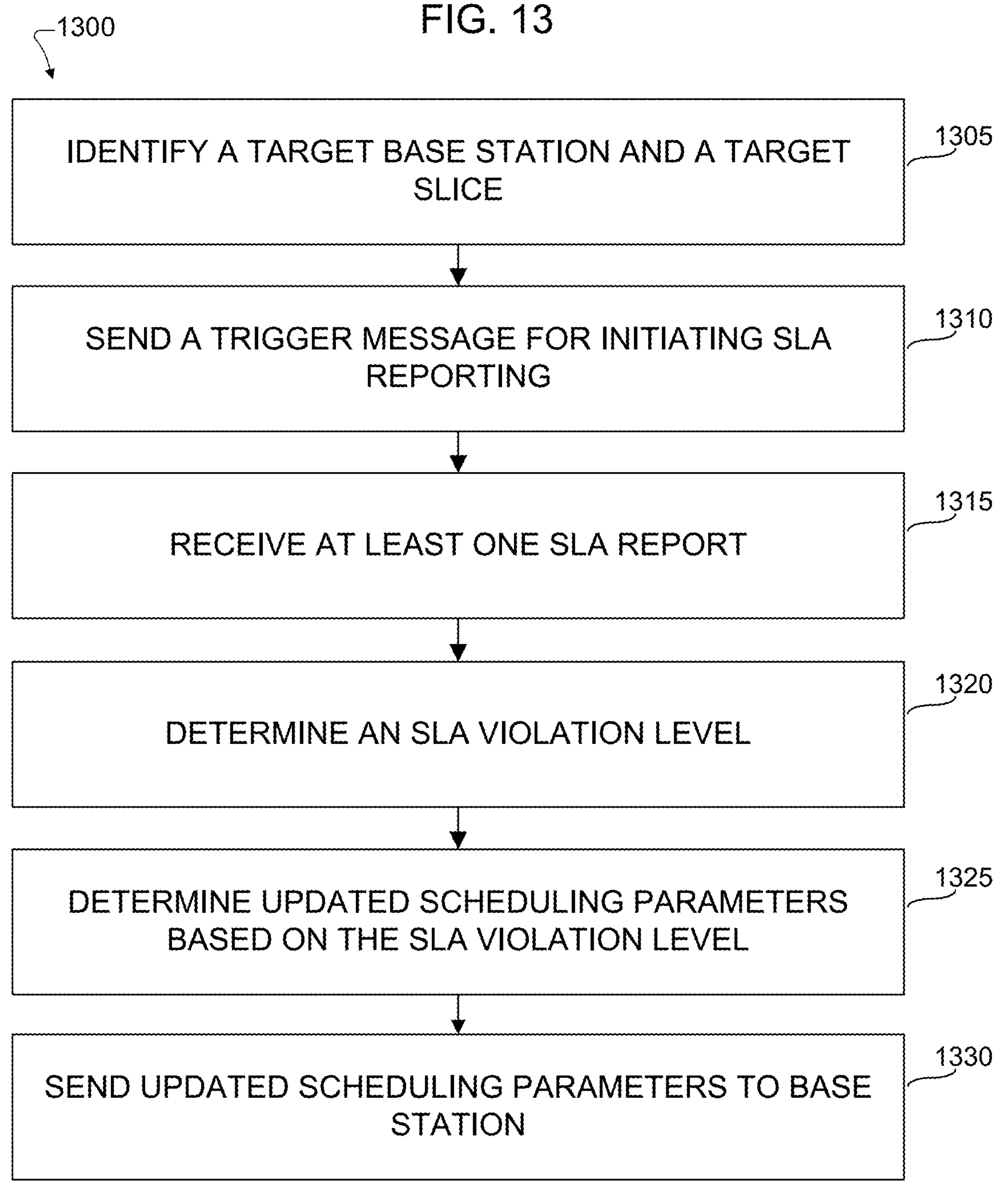
FIG. 13 illustrates operations of an example method 130 for determining SLA violations and updating scheduling parameters according to various embodiments of this disclosure.

FIG. 13 illustrates operations of an example method 1300 for determining SLA violations and updating scheduling parameters (i.e., parameters for configuring a scheduler, such as a scheduler embodying architecture 500 in FIG. 5) according to various embodiments of this disclosure. According to various embodiments, the operations of method 1300 may be performed by a processing platform configured to operate as a network management entity (for example, NME 651 in FIG. 6, or NME 900 in FIG. 9).

Referring to the illustrative example of FIG. 13, at operation 1305, an NME identifies a target base station (for example, base station 401 in FIG. 4, or base station 621 in FIG. 6) and a target slice served by the identified base station for SLA reporting. According to various embodiments, the NME identifies the target base station and target slice for monitoring as described with reference to operations 1010 and 1015 of FIG. 10A. According to certain embodiments, the identified slice comprises at least one electronic device (for example, electronic device 300 in FIG. 3) or user equipment whose connectivity to a network through the identified base station is subject to one or more SLA constraints. According to certain embodiments, at operation 1305, the NME may identify a plurality of base stations or a plurality of slices. The operations of method 1300 are scalable across slices and base stations.

According to various embodiments, at operation 1310, the NME sends a trigger message (for example, the message transmitted at operation 1020 in FIG. 10A) to initiate SLA reporting processes at UEs of the target slice(s) and the target base station(s) identified at operation 1035. Depending on the NME's location within the network architecture, the trigger message may be sent out through backhaul links to the target base stations, or in embodiments where the NME is resident at a base station or other point of connectivity to the electronic device, trigger messages may be sent directly to electronic devices of the target slice.

As shown in the explanatory example of FIG. 13, at operation 1315, the NME receives at least one SLA report. According to various embodiments, the received SLA report contains SLA-related metrics (also referred to as KPIs) obtained from the user equipment (for example, the metrics obtained at operation 1315 comprise a reference signal strength metric (RSSI), a channel quality index metric $CQI_u(t)$, a downlink throughput metric Ru(t), a downlink latency metric $\mathcal{L}$(t), and a metric $Pdrop_u(t-\delta)$ quantifying a fraction of dropped packets. According to certain embodiments, the SLA reports received at operation 1315 may further comprise metrics or KPI values obtained from the target base station, or values of the current scheduling parameters used locally at the base station (for example, scheduling parameters determined by a DU of the base station).

According to various embodiments, at operation 1320, the NME determines, based on the at least one received SLA report, an SLA violation level for the slice. Further, at operation 1325, the NME determines updated scheduling parameters based on the SLA violation level. Depending on embodiments, the determination of an SLA violation level may be performed as part of a process determining updated scheduling parameters, such as by providing "state of the slice" metrics determined at the NME to a pretrained model (for example, neural network 1105 in FIG. 11). According to various embodiments, determining an SLA violation may be performed as part of a rules-based determination of updated scheduling parameters (for example, by traversing the decision tree of "if"-"else-if" statements in section 1210 of FIG. 12A).

As shown in the explanatory example of FIG. 13, at operation 1330, the NME sends the updated scheduling parameters to the base station (for example, to a data unit or Level 3 Scheduler 515 in FIG. 5).

Figure 14:
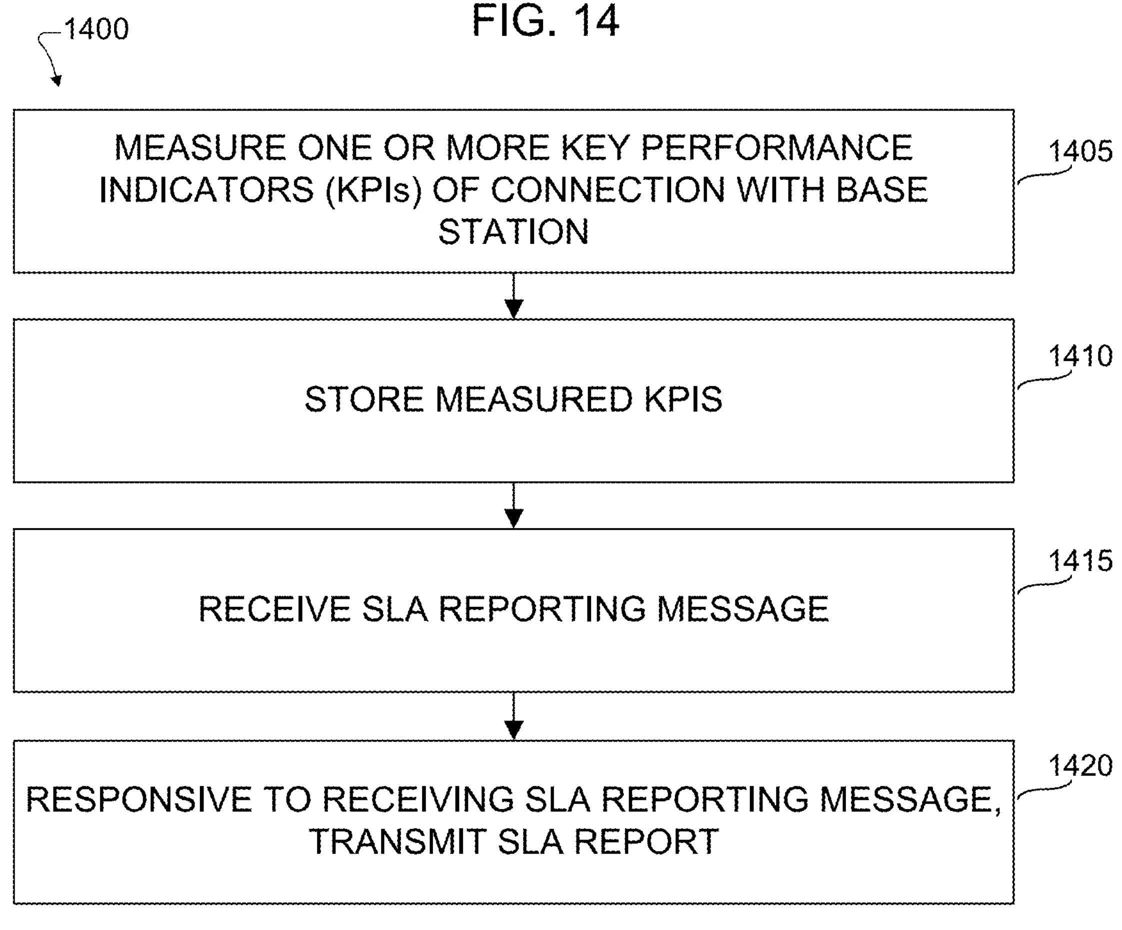
FIG. 14 illustrates operations of an example method 1400 performed at an electronic device belonging to a network slice subject to SLA constraints, according to various embodiments of this disclosure.

FIG. 14 illustrates operations of an example method 1400 performed at an electronic device (for example, electronic device 300 in FIG. 3 or UE 405 in FIG. 4) belonging to a network slice subject to SLA constraints according to various embodiments of this disclosure.

Referring to the illustrative example of FIG. 14, at operation 1405, the electronic device performs measurements (for example, the measurements performed at block 603 of FIG. 6 or operation 710 in FIG. 7) of metrics or key performance indicators of the connectivity between the electronic device and the base station. The KPIs obtained at operation 1410 may include, without limitation, a time stamp value, a value of reference signal received power (RSRP) for a serving base station (BS), a value of a channel quality index for a link between the electronic device and the BS, a value of a downlink throughput metric, a value of an uplink throughput metric, a value of a downlink latency metric, a value of an uplink latency metric, a value of a downlink packet drop probability, a value of an uplink packet drop probability, and an identifier of a slice index for the UE.

According to various embodiments, at operation 1410, the electronic device stores the measured KPIs in a memory of the electronic device (for example, memory 360 in FIG. 3). At operation 1415, the electronic device receives a message to perform SLA reporting (for example, a message such as described with reference to block 705 of FIG. 7). In some embodiments, at operation 1415, SLA reporting is triggered by expiration of a timer or satisfaction of a predetermined condition (for example, a measured KPI exceeding or falling below a specified threshold).

As shown in FIG. 14, at operation 1420, the electronic device transmits an SLA report (for example, the report transmitted at block 730 of FIG. 7) to the base station for forwarding to an NME (for example, NME 900 in FIG. 9).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps. None of the description in this application should be read as implying that any particular element, step, or function is an essential element that must be included in the claim scope.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:

a network interface;

a processor; and a memory containing instructions, which when executed by the processor, cause the apparatus to:

identify a target base station and a target slice comprising an electronic device for service level agreement (SLA) monitoring;

send, via the network interface to the target base station, a trigger message for initiating SLA reporting by the electronic device of the target slice connected to the target base station;

receive, from the target base station via the network interface, at least one SLA report from the electronic device of the target slice;

receive, from a second base station via the network interface, radio access network (RAN) enrichment information for the electronic device of the target slice;

determine an SLA violation level based on the at least one SLA report;

determine updated scheduling parameters based on the SLA violation level, wherein at least one of the SLA violation level or the updated scheduling parameters is determined based on the RAN enrichment information; and send the updated scheduling parameters to the target base station via the network interface.

2. The apparatus of claim 1, wherein the memory further contains instructions, which when executed by the processor, cause the apparatus to:

receive, from the second base station via the network interface, the RAN enrichment information from a second electronic device other than the electronic device providing the at least one SLA report.

3. The apparatus of claim 1, wherein the RAN enrichment information comprises at least one of a future traffic prediction, a location, or a velocity, or comprises information from a slice manager.

4. The apparatus of claim 1, wherein the updated scheduling parameters comprise at least one of, an updated maximum portion of available resource blocks for the target slice, an updated minimum number of available resource blocks for the target slice, an updated scheduling priority of the target slice, or an updated scheduling priority for a user belonging to the target slice.

5. The apparatus of claim 1, wherein the SLA report comprises at least one of: a time stamp of the SLA report, a value of reference signal received power (RSRP) for a serving base station (BS), a value of a channel quality index for a link between the electronic device and the BS, a value of a downlink throughput metric, a value of an uplink throughput metric, a value of a downlink latency metric, a value of an uplink latency metric, a value of a downlink packet drop probability, a value of an uplink packet drop probability, and an identifier of a slice index for the electronic device.

6. The apparatus of claim 1, wherein the SLA report contains processed information from the SLA report from the electronic device, and further contains metrics determined by a BS and wherein the metrics determined by the BS comprise at least one of an average per-user packet arrival rate, an average per-user physical resource block (PRB) allocation, a maximum per-slice allocation parameter, a minimum per-slice allocation parameter, a per-slice scheduling weight, and a user-to-slice mapping.

7. A user equipment (UE), comprising:

a processor configured to:

measure one or more key performance indicators (KPIs) of a radio connection between the UE and a base station (BS); and store the measured one or more KPIs in a memory; and a transceiver operably coupled to the processor, the transceiver configured to:

receive, from the BS, a service level agreement (SLA) reporting message; and responsive to receiving the SLA reporting message, transmit, to the BS for forwarding to a network management entity, an SLA report comprising the measured one or more KPIs, wherein the one or more KPIs comprise a time stamp of the SLA report.

8. The UE of claim 7, wherein the one or more KPIs further comprise at least one of: a value of reference signal received power (RSRP) for a serving base station (BS), a value of a channel quality index for a link between the UE and the BS, a value of a downlink throughput metric, a value of an uplink throughput metric, a value of a downlink latency metric, a value of an uplink latency metric, a value of a downlink packet drop probability, a value of an uplink packet drop probability, and an identifier of a slice index for the UE.

9. The UE of claim 7, wherein the processor is further configured to determine whether the measured one or more KPIs are eligible for inclusion in the SLA report based on satisfaction of recency criteria by the time stamp of the SLA report.

10. The UE of claim 7, wherein the transceiver is configured to:

subsequent to transmitting the SLA report, receive, from the BS, data on a physical downlink shared channel (PDSCH), wherein the data is transmitted based on updated scheduling parameters.

11. A method comprising:

at an apparatus comprising a network interface, identifying a target base station and a target slice comprising an electronic device for service level agreement (SLA) monitoring;

receiving, from the target base station via the network interface, at least one SLA report from the electronic device of the target slice;

receiving, from a second base station via the network interface, radio access network (RAN) enrichment information for the electronic device of the target slice;

determining an SLA violation level based on the at least one SLA report;

determining updated scheduling parameters based on the SLA violation level, wherein at least one of the SLA violation level or the updated scheduling parameters is determined based on the RAN enrichment information; and sending the updated scheduling parameters to the target base station via the network interface.

12. The method of claim 11, further comprising:

receiving, from the second base station via the network interface, the RAN enrichment information for the electronic device of the target slice from a second electronic device other than the electronic device providing the at least one SLA report.

13. The method of claim 11, wherein the RAN enrichment information comprises at least one of a future traffic prediction, a location, or a velocity, or comprises information from a slice manager.

14. The method of claim 11, wherein the updated scheduling parameters comprise at least one of, an updated maximum portion of available resource blocks for the target slice, an updated minimum number of available resource blocks for the target slice, an updated scheduling priority of the target slice, or an updated scheduling priority for a user belonging to the target slice.

15. The method of claim 11, wherein the SLA report comprises at least one of: a time stamp of the SLA report, a value of reference signal received power (RSRP) for a serving base station (BS), a value of a channel quality index for a link between the electronic device and the BS, a value of a downlink throughput metric, a value of an uplink throughput metric, a value of a downlink latency metric, a value of an uplink latency metric, a value of a downlink packet drop probability, a value of an uplink packet drop probability, and an identifier of a slice index for the electronic device.

16. The method of claim 11, wherein the SLA report contains processed information from the SLA report from the electronic device, and further contains metrics determined by a BS and wherein the metrics determined by the BS comprise at least one of an average per-user packet arrival rate, an average per-user physical resource block (PRB) allocation, a maximum per-slice allocation parameter, a minimum per-slice allocation parameter, a per-slice scheduling weight, and a user-to-slice mapping.

17. A method of a user equipment (UE), comprising:

measuring one or more key performance indicators (KPIs) of a radio connection between the UE and a base station (BS);

storing the measured one or more KPIs in a memory;

receiving, from the BS, a service level agreement (SLA) reporting message; and responsive to receiving the SLA reporting message, transmitting, to the BS, an SLA report comprising the measured one or more KPIs, wherein the one or more KPIs comprise a time stamp of the SLA report.

18. The method of claim 17, wherein the one or more KPIs further comprise at least one of: a value of reference signal received power (RSRP) for a serving base station (BS), a value of a channel quality index for a link between the UE and the BS, a value of a downlink throughput metric, a value of an uplink throughput metric, a value of a downlink latency metric, a value of an uplink latency metric, a value of a downlink packet drop probability, a value of an uplink packet drop probability, and an identifier of a slice index for the UE.

19. The method of claim 17, further comprising determining whether the measured one or more KPIs are eligible for inclusion in the SLA report based on satisfaction of recency criteria by the time stamp of the SLA report.

20. The method of claim 17, further comprising:

subsequent to transmitting the SLA report, receiving, from the BS, data on a physical downlink shared channel (PDSCH), wherein the data is transmitted based on updated scheduling parameters.

* * * * *